(12) United States Patent  
Giobbi

(10) Patent No.: US 9,020,854 B2
(45) Date of Patent: *Apr. 28, 2015

(54) LINKED ACCOUNT SYSTEM USING PERSONAL DIGITAL KEY (PDK-LAS)

(75) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 2083 days.

This patent is subject to a terminal disclaimer.

(21) Appl. No.: 10/598,735

(22) PCT Filed: Mar. 8, 2005

(86) PCT No.: PCT/US2005/007535
§ 371 (c)(1),
(2), (4) Date: Jul. 31, 2007

(87) PCT Pub. No.: WO2005/086802
PCT Pub. Date: Sep. 22, 2005

(65) Prior Publication Data
US 2008/0040609 A1    Feb. 14, 2008

Related U.S. Application Data

(60) Provisional application No. 60/551,320, filed on Mar. 8, 2004.

(51) Int. Cl.
G06F 21/00 (2013.01)
G06F 21/10 (2013.01)

(52) U.S. Cl.
CPC ............ G06F 21/10 (2013.01); G06Q 2220/14 (2013.01); G06Q 2220/10 (2013.01); G06F 2221/0711 (2013.01); G06F 2221/0797 (2013.01); G06F 2221/2137 (2013.01)

(58) Field of Classification Search
CPC ....... G06F 21/12; G06F 21/123; G06F 21/34; G06F 21/35
USPC .................... 705/55; 713/185; 726/9
See application file for complete search history.

(56) References Cited

U.S. PATENT DOCUMENTS

| | | | |
|---|---|---|---|
| 5,692,049 A * | 11/1997 | Johnson et al. ............... 713/189 |
| 5,892,900 A * | 4/1999 | Ginter et al. .................... 726/26 |
| 5,991,749 A | 11/1999 | Morrill, Jr. |
| 6,041,410 A | 3/2000 | Hsu et al. |
| 6,343,280 B2 * | 1/2002 | Clark .............................. 705/55 |
| 6,484,946 B2 * | 11/2002 | Matsumoto et al. .......... 235/492 |
| 6,671,808 B1 * | 12/2003 | Abbott et al. ...................... 726/4 |
| 6,788,640 B2 * | 9/2004 | Celeste ...................... 369/272.1 |
| 7,111,789 B2 * | 9/2006 | Rajasekaran et al. ..... 235/472.01 |
| 7,272,723 B1 * | 9/2007 | Abbott et al. ................. 713/185 |
| 7,472,280 B2 * | 12/2008 | Giobbi .......................... 713/182 |
| 2001/0027439 A1 * | 10/2001 | Holtzman et al. .............. 705/39 |
| 2002/0004783 A1 * | 1/2002 | Paltenghe et al. .............. 705/41 |
| 2002/0073042 A1 | 6/2002 | Maritzen et al. |

(Continued)

OTHER PUBLICATIONS

PCT International Search Report and Written Opinion, PCT/US05/43447, Feb. 22, 2007, 7 pages.

(Continued)

*Primary Examiner* — Steven Kim
(74) *Attorney, Agent, or Firm* — Patent Law Works LLP

(57) ABSTRACT

One embodiment of the invention includes a system comprising: a personal digital key and a computer readable medium that is accessible when authenticated by the personal digital key.

18 Claims, 15 Drawing Sheets

(56) References Cited

U.S. PATENT DOCUMENTS

| | | |
|---|---|---|
| 2002/0083318 A1* | 6/2002 | Larose .......................... 713/164 |
| 2002/0109580 A1 | 8/2002 | Shreve et al. |
| 2002/0111919 A1* | 8/2002 | Weller et al. .................... 705/67 |
| 2002/0124251 A1 | 9/2002 | Hunter et al. |
| 2002/0141586 A1* | 10/2002 | Margalit et al. ............... 380/270 |
| 2003/0079133 A1 | 4/2003 | Breiter et al. |
| 2003/0195842 A1* | 10/2003 | Reece ............................ 705/39 |
| 2004/0129787 A1 | 7/2004 | Saito et al. |
| 2004/0193925 A1* | 9/2004 | Safriel .......................... 713/202 |
| 2005/0076242 A1* | 4/2005 | Breuer .......................... 713/201 |
| 2005/0109841 A1* | 5/2005 | Ryan et al. .................... 235/380 |
| 2005/0195975 A1* | 9/2005 | Kawakita ........................ 380/30 |
| 2007/0296544 A1* | 12/2007 | Beenau et al. ............... 340/5.52 |

OTHER PUBLICATIONS

PCT International Search Report and Written Opinion, PCT/US05/46843, Mar. 1, 2007, 10 pages.
International Search Report and Written Opinion, PCT/US05/07535, Dec. 6, 2005, 6 pages.

* cited by examiner

LINKED ACCOUNT SYSTEM USING PERSONAL DIGITAL KEY (PDK-LAS)

This application is the National Stage of International Application No. PCT/USB2005/007535, filed Mar. 8, 2005, published in English under PCT Article 21(2), which is incorporated by reference in its entirety. This application claims priority under 35 U.S.C. §119(e) to U.S. Provisional Patent Application Ser. No. 60/551,320, "Linked Account System Using Personal Diginal Key (PDK-LAS)," by John J. Giobbi, filed Mar. 8, 2004. The subject matter of all of the foregoing is incorporated herein by reference in their entirety.

FIELD OF THE INVENTION

The present invention relates generally to embodiments of a linked account system using personal digital key (PDK-LAS).

BACKGROUND OF THE INVENTION

The market for downloading digital content online is rapidly climbing because distribution of such content is inexpensive, fast, and easy and the quality of the content itself is acceptable. The market, however, remains disorganized due to competing standards, competing companies, discontented artists and producers, and outright theft of digital content.

Digital rights management (DRM) companies seek to solve the foregoing problems by delivering the digital content from the real producers to the right customers and ensuring that everyone who should be paid in fact is paid. DRM seeks to get everyone paid by managing the multiple steps for distributing digital content (music, video, software) online: watermarking, encryption, transaction management, and rights management. Some DRM companies perform all these steps, while other DRM companies specialize in one or two steps of the process.

First, watermarking stamps each piece of digital content with a digital mark so it can be tracked wherever it goes. Digital watermarks are just like paper watermarks, except they cannot be seen or heard. Special software is required to read a digital watermark.

Second, encryption scrambles watermarked digital content and stores it inside a digital safe for shipment around the Internet. The safe protects the content during shipping by allowing only those with the right software key to the safe to decrypt and use the content.

Third, transaction management handles actual payments for the digital content using credit card techniques found elsewhere in e-commerce. An order is placed, a credit card number is taken, account status is checked, and the exchange is authorized.

Finally, rights management manages the information about the digital content itself: what it is, who gets it, how it is delivered, how many times it may be used, how long the rights last, who gets paid, how much they get paid, and how. This information travels with the digital content in something called a digital permit. The permits rests on top of the digital content as it travels the Internet and allows legal users to enjoy the digital content for as long as the rights last.

The primary objective of DRM companies is to deploy technologies that protect digital content as it is distributed online. Some of these proposed technologies and DRM in general are discussed in the article "Digital Rights Management May Solve the Napster 'Problem'," *Technology Investor*, October 2000, pp. 24-27. Although such technologies should reduce the amount of digital theft, they generally favor the content provider at the expense of the consumer or favor the consumer at the expense of the content provider. That is, the rights of either the content provider or the consumer are compromised. For example, some technologies severely limit the consumer's ability to make extra copies of digital content even when the digital content is solely for personal use. Other technologies facilitate the making of copies of digital content which can be used by different consumers without the content provider being compensated by each consumer. The present inventor has discovered an improved DRM system and method that effectively balances and protects the rights of both the consumer and the content provider. In addition, the present inventor has discovered an associated digital content security system for protecting computers and other storage devices from unauthorized use and protecting the digital content stored on computers and other storage devices from being wrongfully accessed, copied, and/or distributed.

With the advent of the Internet, and online shopping, banking and so forth, the Internet has enabled the incidence of credit card, bank account information, and similar data being stolen has risen dramatically. The cost to providers of transactions performed with these stolen items is enormous and results in higher transaction fees and product pricing to consumers, as it is the providers who are typically responsible for charges applied to stolen account information.

Additionally, the inconvenience and tangential problems that victims, consumers, suffer as a result of such crimes are often traumatic, but are minimally troublesome. The insufficient technologies and procedures currently utilized to secure account-based transaction processing do little to prevent these crimes. The problem is most notable in the case of the largest growing segment for such transactions, the on-line environment.

SUMMARY OF THE INVENTION

One embodiment of the invention includes a system comprising: a personal digital key and a computer readable medium that is accessible when authenticated by the personal digital key.

BRIEF DESCRIPTION OF THE DRAWINGS

The foregoing and other advantages of the invention will become apparent upon reading the following detailed description and upon reference to the drawings in which.

Figure 1:
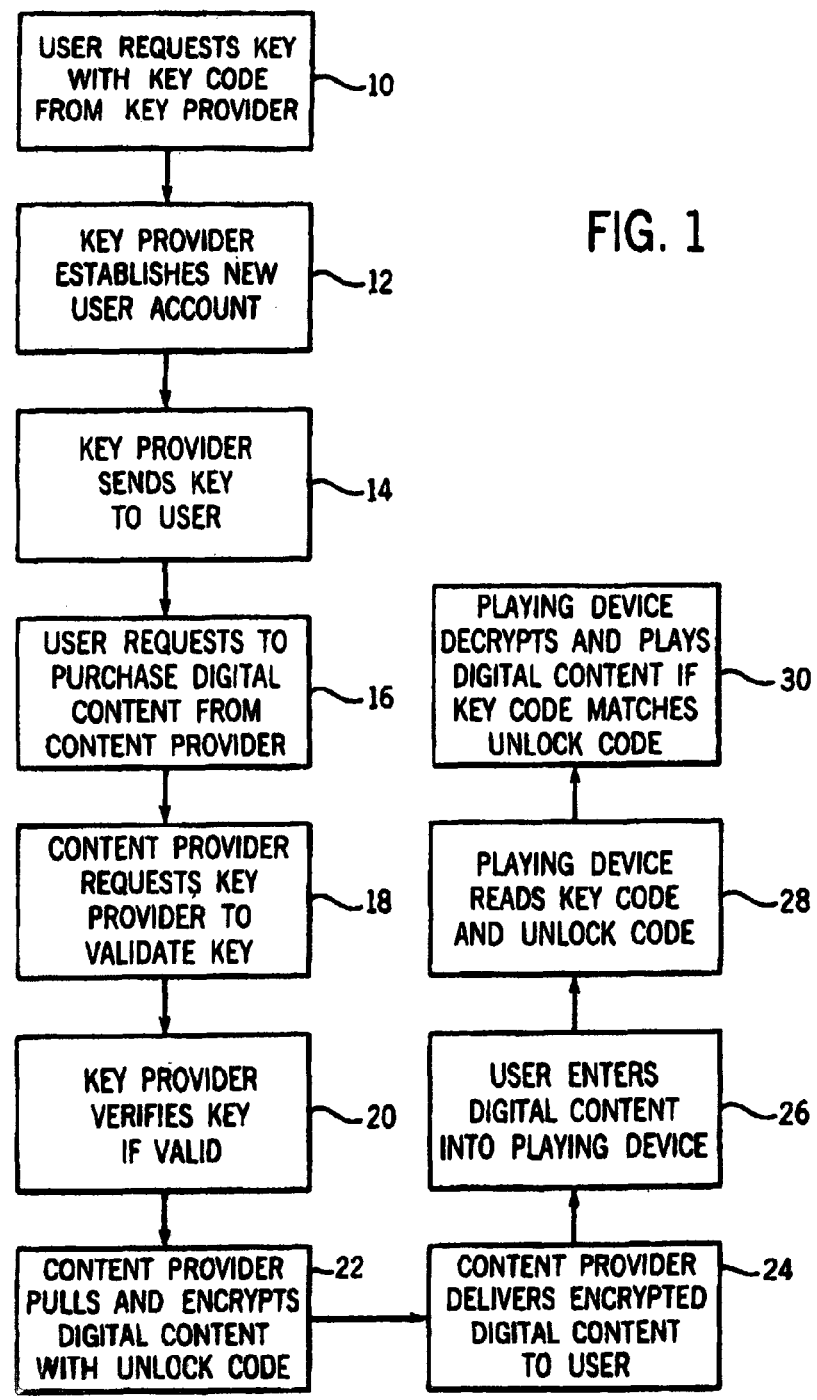
FIG. 1 is a flow chart of a method of managing digital rights in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Definitions

As used herein, "PDK Key or Key" refers to a PDK-compliant wireless key providing access to PDK-protected objects. The acronym "PDK" refers to "personal digital key."

A "PDK-hard drive" refers to a physical or "electronic" hard drive containing an integrated RDC.

A "PDK-protected product/object" refers to a hard drive or accounts or content protected via PDK technology.

An "assigned key" is a PDK key assigned to one or more protected objects.

An "RDC" refers to a Reader/Decoder circuit installed in a user's computer, or built into computer hard drive, or point-of-sale (POS) credit card swipe unit which communicates with PDK keys and decodes PDK data.

A "POS RCD" refers to a reader/decoder circuit integrated in a standard point-of-sale (POS) credit-card swipe unit.

A "manufacturer" as used herein refers to a manufacturer of PDK-keys.

A "provider" as used herein refers to an entity issuing a PDK-linked account, PDK hard drives and so forth.

A "customer" or "user" refers to an individual possessing or utilizing a PDK key.

A "master" or "master key" refers to a PDK key initially assigned to a PDK protected object, and which is required to be present for configuration transactions.

DESCRIPTION

Figure 16:
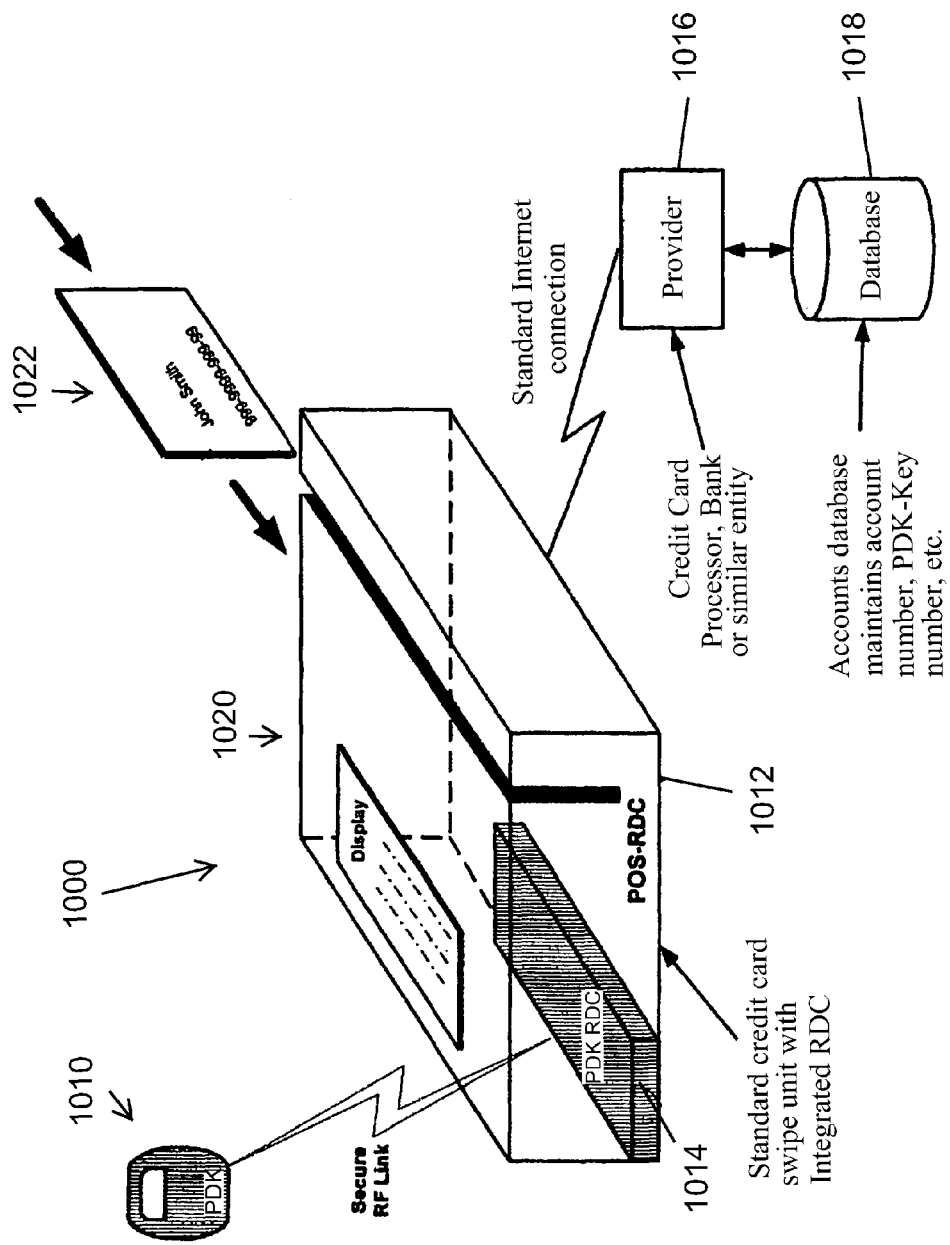
FIG. 16 is a schematic view of a PDK key system embodiment of the invention.

One system embodiment of the invention, illustrated at 1000 in FIG. 16 includes a personal digital key, PDK, 1010, a point-of-sale reader decoder circuit, POS RDC, 1012, a PDK reader decoder circuit, 1014 that is connected to a provider 1016 having a database 1018. For some embodiments, the PDK reader decoder circuit and POS RDC 1014 are in a single unit 1020, which for some embodiments, is a standard credit card swipe unit integrated with RDC. For some embodiments, a standard credit card 1022 is readable in the reader 1020. The provider 1016 may be a credit card processor, bank or other similar entity. The account database 1018 maintains the account number, PDK key number and other identifiers of the user.

Figure 17:
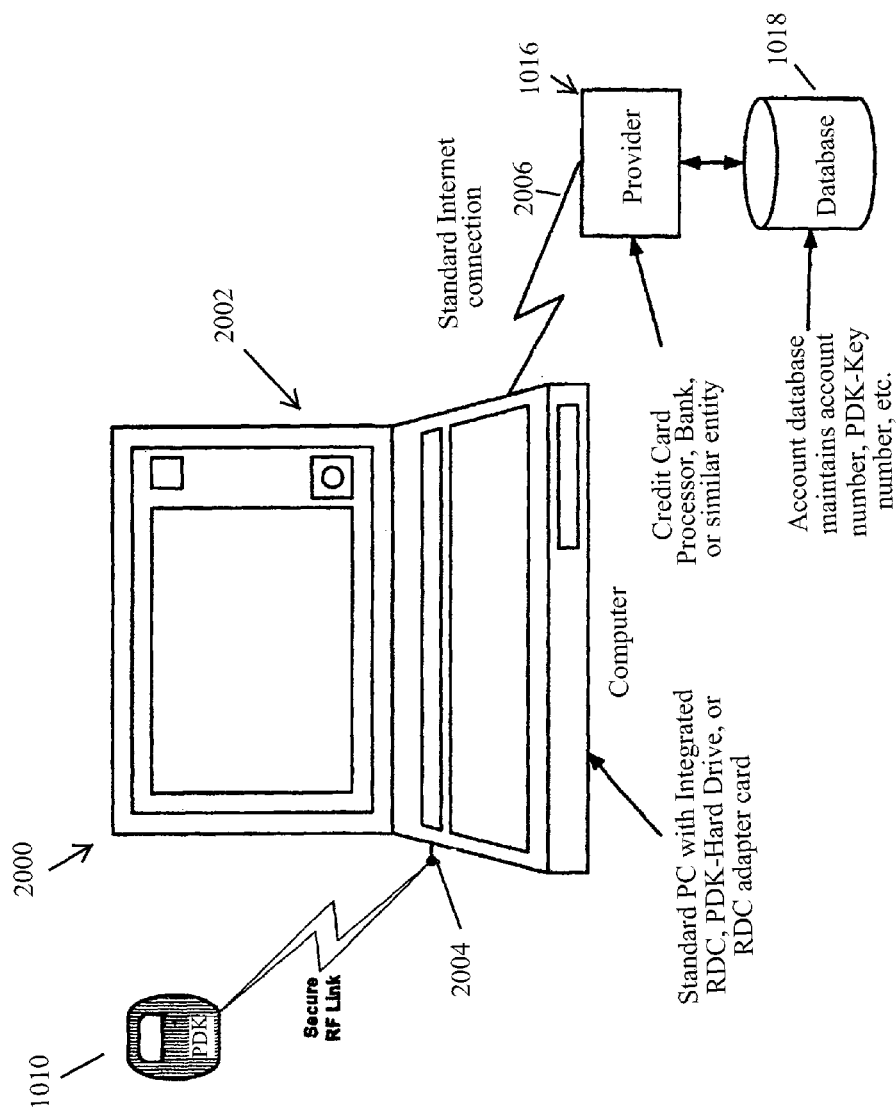
FIG. 17 is a schematic view of a PDK key system embodiment of the invention.

In another embodiment, illustrated at 2000 in FIG. 17, the PDK 1010 interfaces with a computer 2002 through a secure RF link 2004. The computer 2002 is a standard personal computer, with integrated RDC, PDK-hard drive or RDC adaptor card. The computer 2002 communicates with the provider 1016 through a standard Internet connection 2006. The provider 1016 communicates with the database 1018 in a manner as described in the embodiment described above.

Once in possession of a PDK key, a user optionally registers the key with the key manufacturer or a central key database. No usage data, credit or bank account numbers, hard drive IDs, etc. is maintained in the manufacturer's database, only user verification information. This information includes a customer account number, indicating for some embodiments, a customer's record within the manufacturer's database, customer name, address and phone, key number, and status of key, in-use, stolen, lost and so forth. This information is used primarily for verification purposes during lost key replacement procedures.

The data fields stored in PDK keys include a user label which includes user text label in an unprotected field. The data fields also include an account number, which is a user's manufacturer account number, which is in a protected field. The data fields also include a key number which is a unique key identification and is a protected field.

The PDK key communicates with one of three basic implementations of a PDK-RDC which include POS RDC, a standard credit card swipe type device with an integrated RDC. A second implementation is an RDC adaptor, which is an add-on PC board RDC, interfacing via USB, firewall, PC card, expansion slot and so forth. A third implementation is a PDK hard drive which is a standard hard drive with an integrated RDC.

POS RDC devices are used in stores at checkout lanes, purchase counters, hand-held swipes, and so forth. RDC adaptors or PDK hard drives are intended for PC based use.

Physical cards such as credit/debit card accounts, bank accounts, membership accounts, or similar types of accounts, intended for use with the PDK LAS technology are conventional cards. No changes are required to such cards in order to ready them for use with the PDK LAS technology.

From a consumer standpoint, this feature, along with an ability for a PDK-key to be purchased and assigned to an object at any point, enables easy acceptance of the technology.

Additionally, the PDK-LAS technology offers great flexibility in how PDK-keys are distributed, assigned, and used. For example, providers may optionally allow dynamic key assignment, assigning keys at a later date, assigning multiple keys to the same account and so forth, and users may elect to use one PDK key for all their PDK based security needs, i.e. one PDK key can be assigned to multiple accounts, PDK hard drives, and other PDK based products.

Specific examples illustrating uses of the PDK linked account embodiments are described as follows. These examples are presented to show particular applications of the PDK linked accounts and are not intended to limit embodiments of the invention.

In a first example, a user wishes to assign a key to a new PDK linked account. The user logs onto a provider's site over the Internet via the user's personal computer, in one embodiment. The user inputs whatever validation the provider typically requires. Sufficient data is requested by the provider during this transaction to authenticate the user. An RDC reads the user's PDK key data and transmits the data to the provider. The provider confirms the user's request to link the PDK key to the account. Once confirmed, the PDK key data is permanently stored in the provider's database as a master PDK key and can only be changed by directly contacting the provider.

In one other embodiment, users phone providers directly and verbally relay all required information, including master PDK key data, printed on a card included with the PDK key at purchase. For users with Internet access but no RDC, this information is hand entered on the provider's website.

In a second example, a user wishes to assign additional keys to a PDK linked account. The user logs onto a provider site and inputs whatever validation the provider typically requires. The user ensures that the assigned master PDK key is within the vicinity of RDC. The RDC reads the master and additional PDK key data and transmits the data to the provider. The provider confirms a user's request to link additional PDK keys to the account number, or change PDK keys or remove PDK keys. Once confirmed, the updated PDK key data is stored in the provider's database along with master PDK key data.

In an alternate embodiment, to facilitate users without an RDC equipped personal computer and Internet access, users may phone providers directly and verbally relay all required information, including both master and additional PDK key data, printed on cards (or similar) included with PDK keys at purchase. For users with Internet access but no RDC, this information may be hand entered on the provider's website.

In a third example, the user wishes to utilize a PDK linked account to purchase a product at a store. The user ensures that an assigned PDK key is within the vicinity of POS RDC at a checkout counter. The RDC reads the user's PDK key and transmits data, along with the user's account number, acquired using currently accepted procedures, to the provider for verification. If more than one PDK key is read at the counter, either data from all of the PDK keys may be transmitted to the provider or User Labels may be displayed on POS RDC to enable the user or clerk to select the appropriate PDK key. The provider looks up the account record in its database using the transmitted account number and compares the transmitted PDK key data to information stored in the record. If a match is confirmed, the sales transaction is completed normally. If not confirmed, the transaction cannot be completed.

A fourth example is one where a user desires to utilize a PDK linked account to purchase a product on-line or the user wishes to access account information on line. The user must ensure that an assigned PDK key is within the vicinity of RDC. The RDC reads the user's PDK key and transmits data, along with the user's account number, acquired using conventional techniques, to the provider for verification. If more than one PDK key is read at RDC, either data from all PDK keys is transmitted to the provider or User Labels are displayed on a computer screen to enable the user to select the appropriate PDK key. The provider looks up the account record in its database using the transmitted account number and compares the transmitted PDK key data to information stored in the record. If a match is confirmed, the transaction/session is completed normally. If not confirmed, the transaction/session cannot be completed.

A fifth example is one where the user loses a PDK key. After an initial master PDK key setup, users are encouraged to immediately assign an additional PDK key, which serves as a day-to-day key, and store the master PDK key in a safe location. If the day-to-day key is lost, the master is usable to assign the new day-to-day key. As a last resort, for users losing all PDK keys, the key manufacturer may be contacted and, after authentication is performed, instructed to ship a replacement PDK key.

Turning now to the drawings and referring initially to FIG. 1, there is depicted a method of managing digital rights in accordance with the present invention. First, a new user requests a physical electronic key or data unit from a key provider (step 10). The key provider may offer a web site on the Internet, a toll free telephone number, and/or retail outlet where the key may be acquired. In addition, the key provider may allow a key to be requested in writing, preferably using a form designed by the key provider. In one model the user may acquire as many keys as desired, while in another model each user is only entitled to a single key.

Second, in response to the user's request for a physical key, the key provider establishes a new secure account for that new user in a secure user account database (step 12). The new account may include the following data fields: account number, password, software encryption key, user label, number of users (linked to account), address, telephone number, e-mail address, and custom fields. The custom fields may, for example, include demographic information such as the user's age, gender, marital status, income level, interests, hobbies, etc. The physical key may include the following data fields: user label, account number, software decryption key, and a custom storage area. The user label and the account number serve as a first activation code (or key code) for the acquired physical key. All data fields on the physical key, except for the user label, are preferably encrypted. To allow the user to view his or her account in the future, the user is preferably assigned a login name and the above-noted password.

Third, the key provider ships the physical electronic key to the new user via a package courier such as the U.S. Postal Service, United Parcel Service, or Federal Express (step 14). In one pricing model the physical key is sent to the user at no charge, while in another pricing model the physical key must be purchased by the user. If the physical key must be purchased by the user, either the user must provide credit/debit card information to the key provider in step 10 to pay with a credit/debit card, or the key provider includes an invoice with the shipped key in step 14.

Figure 2:
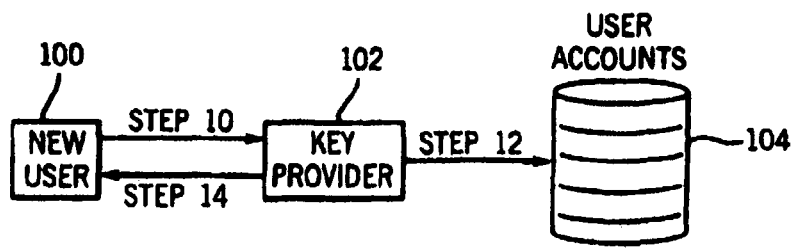
FIGS. 2, 3, and 4 are block diagrams of portions of a DRM system for implementing the method in FIG. 1.

FIG. 2 is a block diagram of a system for implementing steps 10, 12, and 14 of the method of managing digital rights. The system includes the new user 100, the key provider's web site 102, and the user account database 104.

Referring back to FIG. 1, fourth, the user transmits his or her activation code in the physical key to a digital content provider, who may have a cooperative relationship with the key provider, and requests to purchase digital content (music, video, or software) from that content provider (step 16). The content provider may offer a web site on the Internet containing a listing of digital content available for purchase. To transmit the activation code to the content provider via the web site, the user may manually enter the activation code onto a secure page of the web site. Alternatively, the transmission of the activation code may be automatically implemented with wireless technology. Specifically, the user's computer may be outfitted with a detector that detects the activation code in the user's physical key and then relays the activation code to the content provider via the web site. The content provider may be affiliated with the key provider or may be separate from the key provider but have an arrangement therewith.

Fifth, the content provider requests the key provider to verify the activation code transmitted by the user (step 18). The content provider may send this request to the key provider's web site. Sixth, the key provider in turn accesses the user's account in the user account database and determines whether the activation code is in fact valid (step 20). The key provider may also determine whether the activation code is associated with the user that transmitted the activation code to the content provider. If the activation code is rejected as being invalid, the content provider is so informed and the content provider in turn will not honor any request by the user to purchase digital content. If, however, the activation code is accepted as being valid, the content provider is so informed and the purchase transaction proceeds. As used herein, the term "key provider" generically refers to the entity or entities that manufacture, distribute, and validate the physical keys. These functions may actually be performed by multiple entities at different locations or by a single entity at a single location.

Seventh, after securing validation of the first activation code in the physical key, the content provider pulls the requested digital content from a digital content database/library, marks the digital content with a second activation code (or unlock code) associated with the first activation code in the physical key, and encrypts the marked digital content (step 22). The second activation code in the digital content may simply be the same as the first activation code in the physical key, but at least partially encrypted for security. In one embodiment, the "key-secured" content file includes the following data fields: user label, account number, and digital content. The user label and the account number serve as the second activation code for the digital content. If the content is merely for sampling (described in connection with FIG. 6), the file may include such additional data fields as a receiver/decoder circuit identification number, hour stamp, and life hours. All data fields on the content file, except for the user label, are preferably encrypted.

Eighth, the content provider delivers the encrypted digital content to the user (step 24). The encrypted digital content may be delivered by downloading the encrypted digital content to the user's computer while the user is online at the content provider's web site, by attaching the digital content to an e-mail addressed to the user, or by shipping a disk containing the encrypted digital content to the user via a package courier. The user may pay for the digital content either by providing credit/debit card information to the content provider in step 16 or by paying off of an invoice included with delivered digital content. If the digital content is delivered online, the user is preferably required to provide the credit/debit card information and have such information approved as a prerequisite to delivery of the digital content. If the user possesses more than one physical electronic key and would like the acquired digital content to function with each of the user's keys, all of the activation codes are applied to the digital content. The content provider charges the user based on the number of keys with which the user would like the digital content to function. For example, the user may be charged the same amount for each activation code, or may be charged a larger amount for one activation code and lesser amounts (e.g., surcharges) for additional activation codes.

Figure 3:
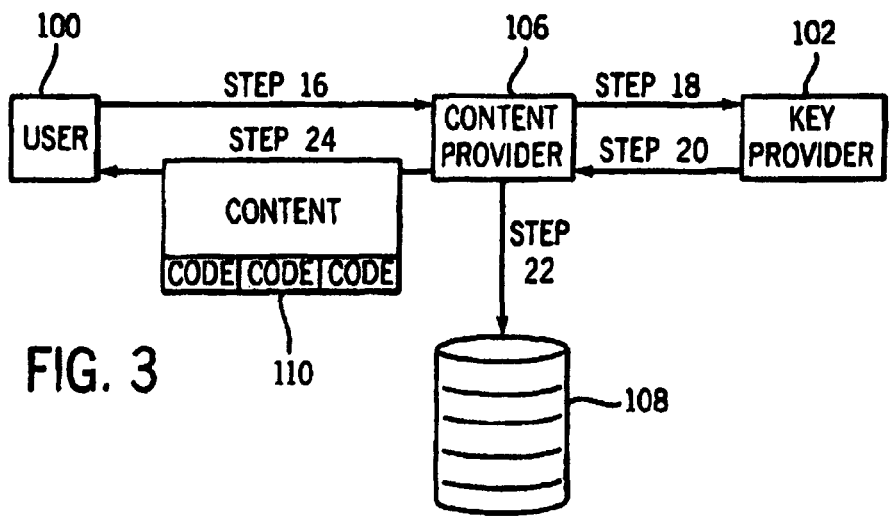

FIG. 3 is a block diagram of a system for implementing steps 16, 18, 20, 22, and 24 of the method of managing digital rights. The system includes the new user 100, the content provider 106, the key provider's web site 102, the digital content database 108, and the acquired digital content 110.

Returning to FIG. 1, ninth, the user enters the encrypted digital content into a playing device of a type suitable for playing the digital content (step 26). The device may, for example, be an MP3 player, a personal computer, a DVD player, a CD player, a cellular phone, or other portable device. In one embodiment, the device contains a wireless transceiver adapted to receive a radio frequency signal transmitted by a corresponding wireless transceiver in the user's physical electronic key. The wireless transceiver in the device is optionally tracked and "secured" for audit purposes by permanently including a unique identifier assigned by the device manufacturer in the transceiver.

Tenth, with the user's physical electronic key within a short range (e.g., few meters) of the playing device, the playing device reads (1) the first activation code carried in a secure radio frequency signal transmitted by the transceiver in the physical key to the transceiver in the device and (2) the second activation code marked on the encrypted digital content (step 28). The device contains decryption software or hardware for decrypting the encrypted digital content to the extent necessary to read any encrypted portion of the second activation code.

Eleventh, the playing device compares the first activation code and the second activation code and determines whether the first activation code is associated with the second activation code (step 30). Steps 29 and 30 may be performed, for example, when the user presses a "play" button on the playing device or when the user first enters the encrypted digital content into the playing device. If the first activation code is associated with the second activation code, the device decrypts and plays the digital content. If the first activation code is not associated with the second activation code, the device does not play the digital content. If the second activation code is simply the same as the first activation code, then the foregoing comparison determines whether there is a match between the first activation code and the second activation code. In a preferred embodiment, the device continues to play the digital content only while the physical key is sufficiently close to the device to communicate the first activation code to the device and allow the device to compare the first activation code to the second activation code at least partially encrypted with the digital content even while the digital content is being played. If the physical key is moved out of range, the device is no longer enabled to decrypt and play the digital content. In an alternative embodiment, once the device is initially enabled to decrypt and play the digital content, the device remains enabled until either the "play" function is stopped, a play track/song ends, or the digital content is removed from the device, even if the physical key is moved out of range such that the key can no longer communicate the first activation code to the device.

Figure 4:
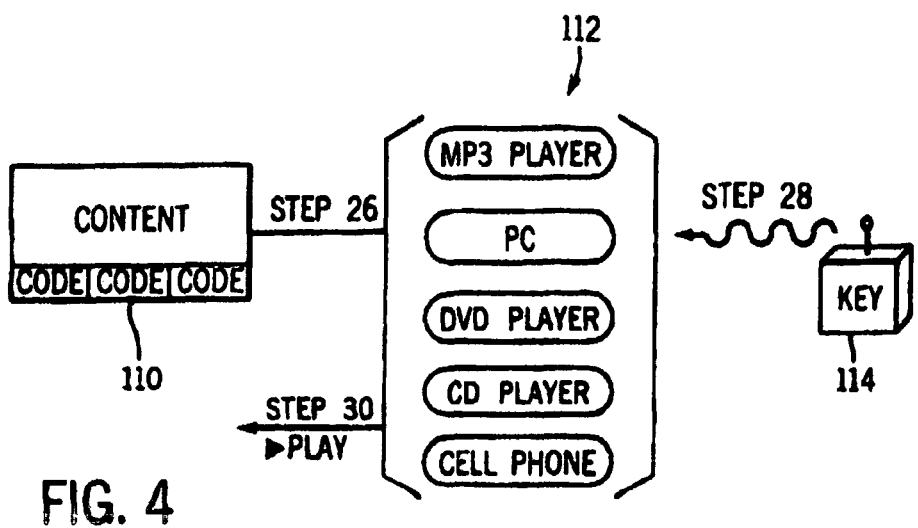

FIG. 4 is a block diagram of a system for implementing steps 26, 28, and 30 of the method of managing digital rights. The system includes the encrypted digital content 110, the key-enabled playing devices 112, and the user's physical electronic key 114.

As stated above, the user's physical electronic key and the key-enabled playing device contain respective wireless transceivers to communicate the activation code in the key to the device. In a preferred embodiment, the transceivers are small, inexpensive Bluetooth radio chips that operate in the unlicensed ISM band at 2.4 GHz and avoid interference from other signals by hopping to a new frequency after transmitting or receiving a packet. The radio chips are plugged into electronic devices, which can then communicate over short distances and through obstacles by means of radio waves. Bluetooth is a term used to describe the protocol of a short range (e.g., about 10 meters) frequency-hopping radio link between devices containing the radio chips. These devices are then termed "Bluetooth-enabled." The secure radio link replaces a cable that would otherwise be used to connect the devices. Further details concerning Bluetooth wireless technology may be obtained from www.bluetooth.com.

Wireless technologies other than Bluetooth may be used to communicate the activation code from the user's physical electronic key to the playing device. One example of an alternative wireless technology is known by a trade term "Wi-Fi," which is short for wireless fidelity and is another name for IEEE 802.11 b. Products certified as Wi-Fi by the Wireless Ethernet Compatibility Alliance (WECA) are interoperable with each other even if they are from different manufacturers. A user with a Wi-Fi product can use any brand of access point with any other brand of client hardware that is built to the Wi-Fi standard.

In other alternative embodiments, the communication between the user's physical electronic key and the playing device is not wireless. Rather, in one alternative embodiment, the user's physical electronic key communicates the activation code to the playing device via a transmission line such as a serial cable that plugs into the key at one end and the playing device at the other end. In another alternative embodiment, the key is a smart card or magnetic card into which the activation code is encoded, and the key is configured to physically fit into a card reader slot on the playing device.

The above-described DRM method and system for implementing the method are advantageous in that they afford the key holder with tremendous versatility in copying and using encrypted digital content for personal use. At the same time, the rights of the content provider are protected because only the key holder with a key-enabled device can use the encrypted digital content. The key holder can copy the encrypted digital content as many times as desired, but can only play the encrypted digital content on a key-enabled device that is enabled with the physical electronic key coded to decrypt the encrypted digital content. Thus, the digital content, even when copied, remains personal to the key holder. Individuals other than the key holder cannot use the encrypted digital content, even if they copy it, because both the original and copies of the encrypted digital content are still encrypted and the individuals do not hold the physical electronic key coded to decrypt the digital content.

A core element of the present invention is the concept of a portable, physical electronic key that is personal to a particular user. The physical key represents a DRM solution that fully addresses the needs of both consumers and publishers of digital content. The physical key is permanently associated with a user's digital content library. At the time of content acquisition, the physical key becomes permanently associated with the newly acquired content. The user is now "linked" to that acquired content. A user (e.g., individual or family) may own as many physical keys as desired, but every piece of encrypted digital content purchased is tied to one specific key. The user may duplicate or transfer the acquired content to any media or device for playback as many times as desired, as long as the associated physical key is present. Thus, the present invention guarantees that the acquired content is played only by the user who has legitimately paid for it. The present invention gives consumers unprecedented freedoms and conveniences to use legitimately purchased content while still fully protecting content providers' rights.

Figure 5:
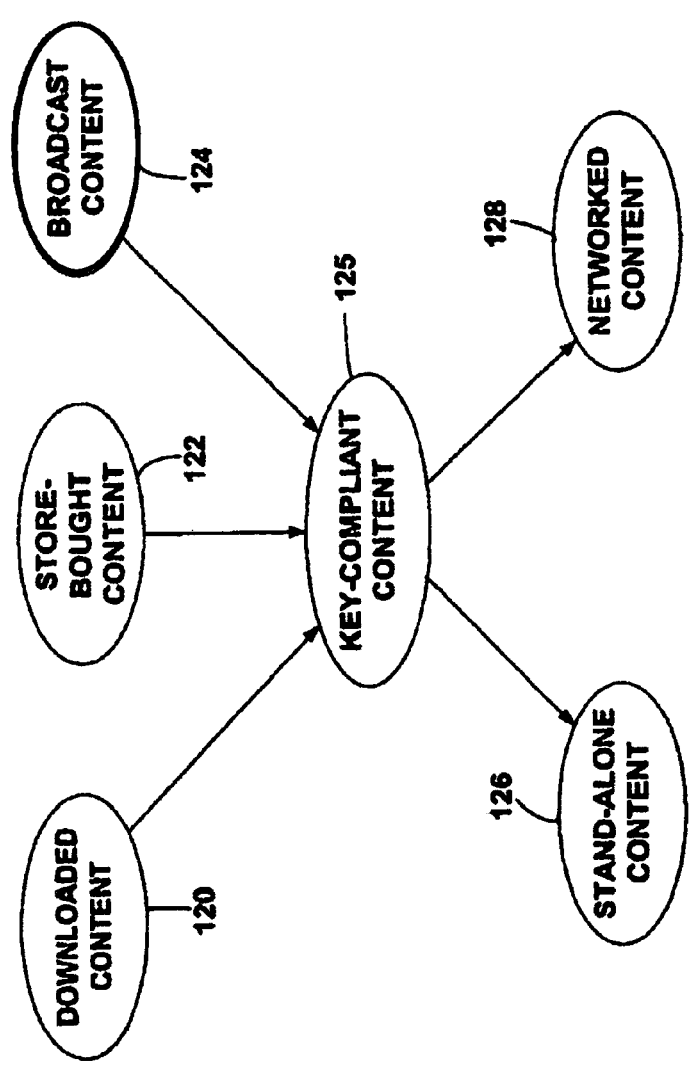
FIG. 5 is a conceptual model of core options for acquiring digital content that can be encoded to produce key-secured content and core options for playing back the key-secured content.

Referring to FIG. 5, the present invention fully supports the use of "key-secured" digital content 125 with all core content acquisition options and all core playback options. The key-secured digital content 125 is encoded with a second activation code associated with a first activation code stored on the user's physical electronic key. The core acquisition options include downloaded content 120, store-bought content 122, and broadcast content 124. The core playback options include stand-alone devices 126 and networked devices 128. Each of these options are described in further detail below.

Figure 6:
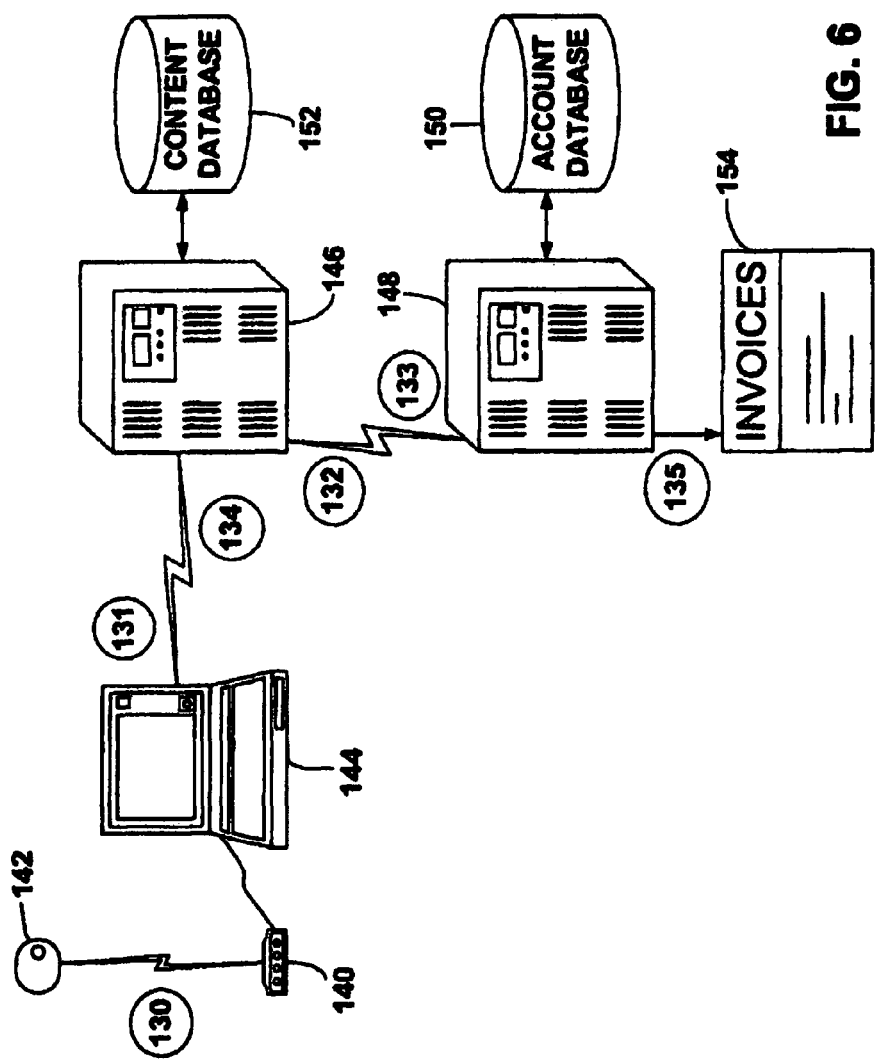
FIG. 6 is a block diagram for implementing a core acquisition option of downloaded content.

Referring to FIG. 6 generally, as already noted in FIGS. 1 through 4, a primary application of the present invention is its use in the downloading of digital content from the Internet. A consumer shops a content distributor's website and selects a piece of content they wish to purchase (music, movies, software, E-books, etc.). The consumer then provides the web site with standard on-line purchase information including the selection's title and method of payment, as well as their physical electronic key information. Transparent to the consumer, the distributor's web site links to the key provider's web site and transmits the physical key information for validation. The key provider's web site then provides the distributor's web site with the information required to prepare the acquired content for secure shipment to the consumer (or notification that the physical key was invalid). The key provider's web site records the transaction for later billing. Finally, the distributor's web site retrieves a copy of the digital content from its library, permanently links it to the consumer's physical key (by using the key's information to encrypt it), and transmits the secured content to the consumer. The consumer is now free to duplicate the content as often as desired, and to play the content on any key-enabled playback device.

Referring to the specifics of FIG. 6, the process of implementing the core acquisition option of downloaded digital content 120 (see FIG. 5) proceeds as follows. At step 130, a receiver/decoder circuit 140 retrieves an account number from a consumer's physical key (transponder) 142 over a secure RF link. At step 131, the consumer enters such data as a password, purchase selection, and method of payment via the consumer's personal computer 144. The data is transmitted to a content distributor's web site 146 from the consumer's personal computer 144. At step 132, the content distributor's web site 146 transmits the account number and password to a key provider's web site 148. At step 133, the key provider's web site 148 authenticates all data against its database 150 and, if authentic, returns such information as the account number, user label, number of users, and software encryption key to the distributor's web site 146. If the data is not valid, the key provider's web site 148 sends a message to the distributor's web site 146 indicating the same. A counter, used for the key provider's billing purposes, is incremented. At step 134, the distributor's web site 146 pulls the purchased content file from its database 152, encrypts it with the software encryption key it received in step 133, and builds a final key-secured content file that is then transmitted to the consumer's personal computer 144. Charges are assessed based on the number of users, etc. and billed to the consumer according to the method of payment. At step 135, invoices 154 are generated and sent to content distributors by the key provider's web site 148 on a regular cycle.

Optionally, to enable content providers to offer sample content (e.g., limiting playback to the device on which the content was originally downloaded, for a specified period of time) a special "enhanced" version of a receiver/decoder circuit 140 can be produced. These enhanced receiver/decoder circuits (primarily for PC's) would each include a unique identification number and additional functionality enabling them to "talk" to a key provider's web site 148 to acquire secured timing information. Sample content files may include the following information (in their encrypted header section):
  identification number of enhanced receiver/decoder circuit used for downloading and transmitted by the receiver/decoder circuit to the key provider's web site at the time of content purchase;
  hour stamp (i.e., the hour in which the content was downloaded; and life hours (i.e., number of hours content remains valid, such as perpetual, one hour, 24 hours, 48 hours, etc.).

The above information is used by an "enhanced" receiver/decoder circuit during playback to determine whether a content file has "expired" or is attempting to play on an unauthorized device (i.e., any device except the device on which the content was originally downloaded). This capability allows content distributor web sites to distribute limited-use samples with associated tiered-pricing models.

Figure 7:
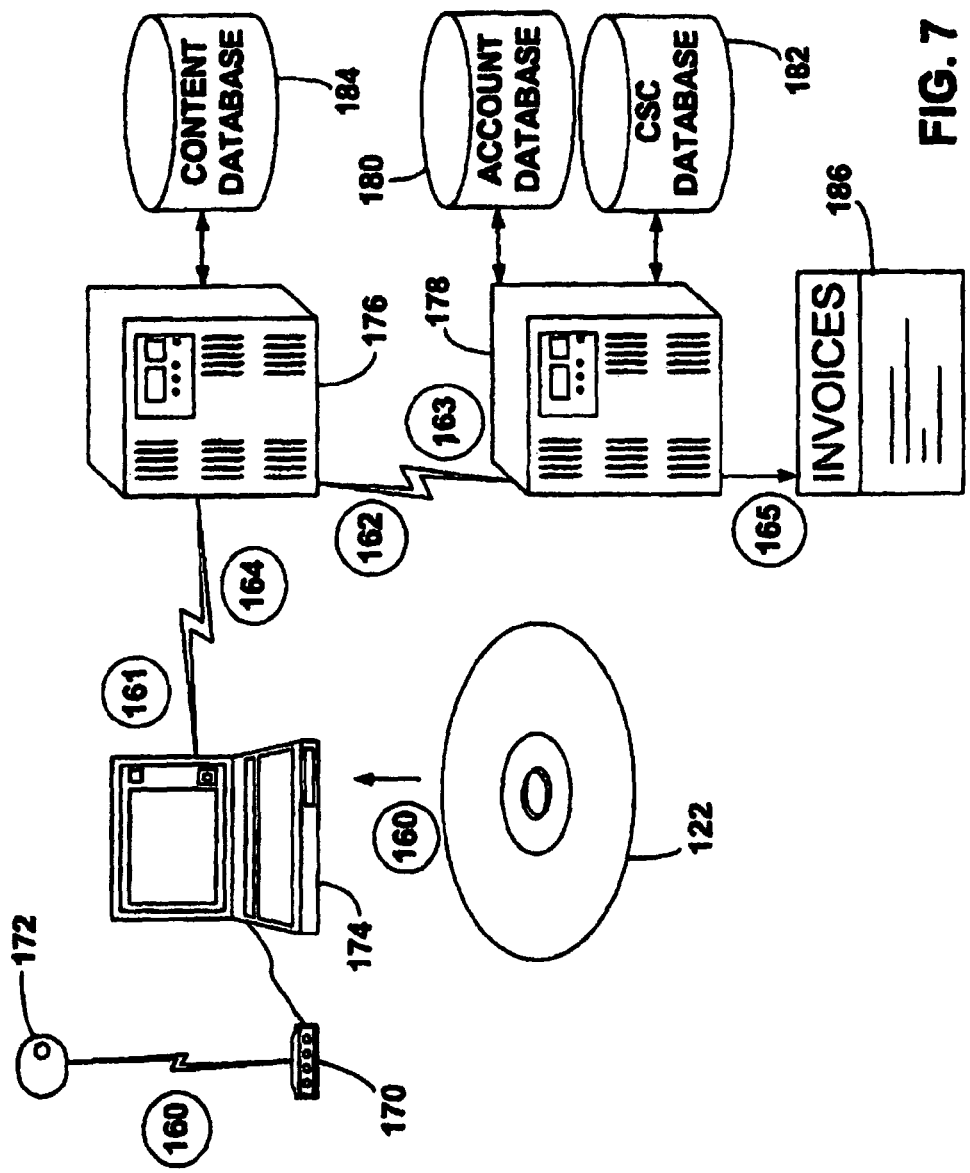
FIG. 7 is a block diagram for implementing a core acquisition option of store-bought content.

Referring to FIG. 7 generally, the present invention can be extended to store-bought content. To fully integrate store-bought content into the present invention, traditional store-bought content is modified in two ways. First, the content is distributed in a copy protected format (e.g., using any valid copy protection technology). Second, the content contains a unique content serial code. The content serial code may be contained either directly in the digital content or as a physical label. Each content serial code is designated by a content distributor during manufacturing and stored in the key provider's database. This database is later used to validate that each content serial code is unique and used only a prescribed number of times. To a consumer, a content serial code on their newly purchased store-bought content represents a download of a key-secured version of that content for free or a prescribed price. This key-secured copy provides the consumer with exactly the same advantages and freedoms as any other key-secured content. From the consumer's standpoint, the download process occurs exactly as any other standard key-secured content download with the exception of how the payment is handled. The "payment" is the content serial code. By providing all of the advantages of the present invention to consumers of legacy-capable store-bought content (by way of "content serial code downloads"), the scheme provides the industry with the first complete DRM solution.

Referring to the specifics of FIG. 7, the process of implementing the core acquisition option of store-bought digital content 122 (see FIG. 5) proceeds as follows. At step 160, a receiver/decoder circuit 170 retrieves an account number from a consumer's physical key (transponder) 172 over a secure RF link, and the consumer's personal computer 174 reads a content serial code from the store-bought content 122. The store-bought content 122 contains the content serial code that uniquely identifies the content. The format of the content serial code may, for example, be PPPP.FFF.0123456789 where PPPP is a provider identification, FFF is a facility identification, and the numbers represent a sequence number. The store-bought content 122 incorporates a copy protection scheme such as Macrovision™, Key2audio™, or SafeAudio™. Disc "copy flags" (specified in SDMI standards) may also be set to further inhibit duplication efforts.

At step 161, the consumer enters such data as a password and purchase selection via the consumer's personal computer 174. The previously-read content serial code specifies that the method of payment is to a "content serial code-credit" (i.e., there is typically no charge for this download because the content serial code confirms that the download in process is of content that the consumer has already legitimately purchased). The data is transmitted to a content distributor's web site 176 from the consumer's personal computer 174. At step 162, the distributor's web site 176 transmits the content serial code, account number, and password to a key provider's web site 178. At step 163, the key provider's web site 178 authenticates all data against its databases 180 and 182 and, if authentic, returns such information as the account number, user label, number of users, software encryption key, and paid-flag (indicating the content serial code has been validated) to the distributor's web site 176. The key provider's web site 178 now sets the paid-flag to disable any further downloads and records the account number field in the content serial code database 182 for auditing purposes. If the data is not valid, the key provider's web site 178 sends a message to the distributor's web site 176 indicating the same. A counter, used for the key provider's billing purposes, is incremented. Each entry in the content serial code database 182 may include the following data fields: CDC #, paid-flag, and account number. At step 164, the distributor's web site 176 pulls the content file from its database 184, encrypts it with the software encryption key it received in step 163, and builds a final key-secured file that is then transmitted to the consumer's personal computer 174. No charge is typically assessed because a valid content serial code serves as "payment" for the download. At step 165, invoices 186 are generated and sent to content distributors by the key provider's web site 178 on a regular cycle.

Figure 8:
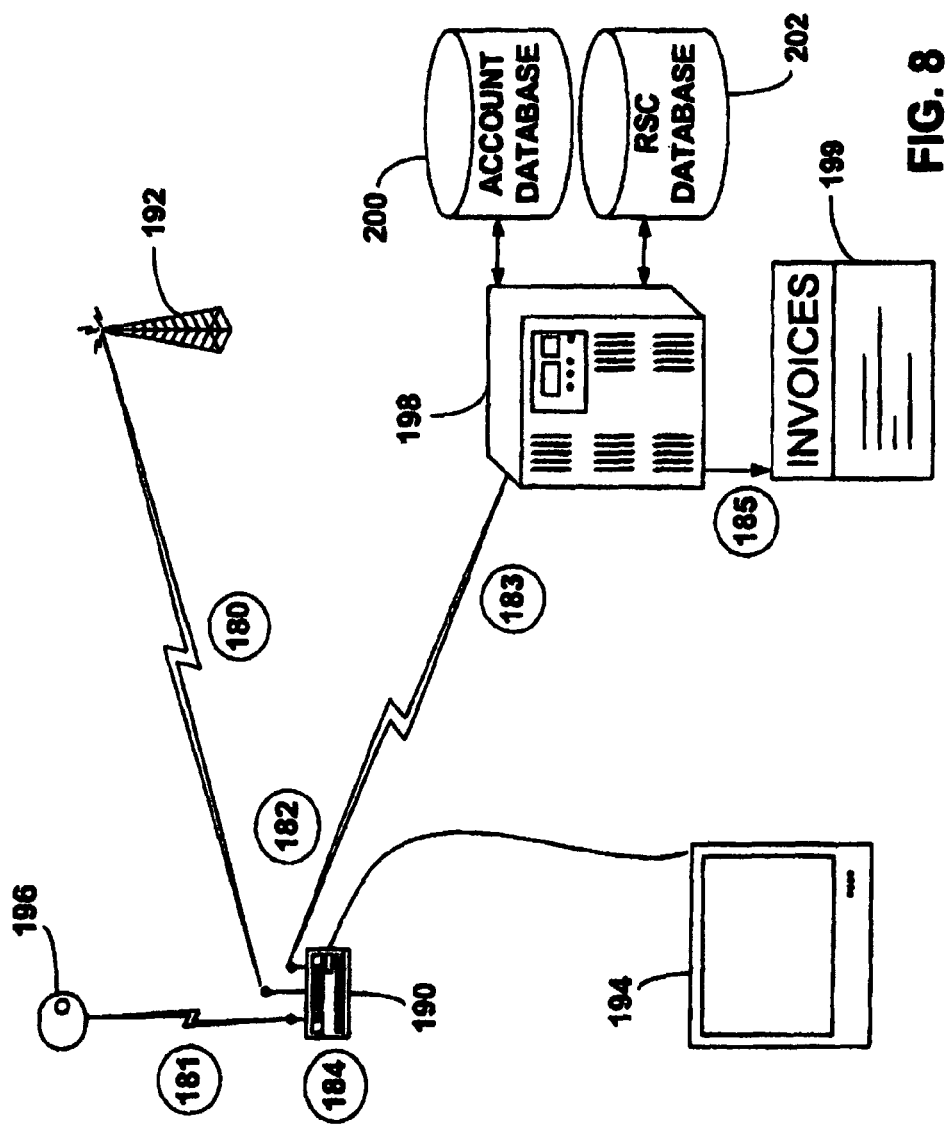
FIG. 8 is a block diagram for implementing a core acquisition option of broadcast content.

Referring to FIG. 8 generally, the present invention can be extended to broadcast content. To fully integrate broadcast content into the present invention, traditional broadcast content is only minimally modified. The modification is that the broadcast content is transmitted in a copy protected format (such as the DVD standard known as Content Scramble System (CSS)). The remainder of the process is described below. A key-enabled recording device, incorporating a unique identifier, receives copy-protected broadcast content. If only playback of the broadcast content is desired, basic decoding (e.g., CSS) is performed and the broadcast content is sent on for playback. If the consumer wishes to record the broadcast content, however, the recording device performs additional steps prior to sending the broadcast content on for playback. The recording device connects to the key provider's web site to validate the recording device's internal identifier and the consumer's physical key. If both are valid, the recording device translates the broadcast content into a key-secured format by encoding it with the consumer's activation code, and then stores the key-secured content file, with its identifier permanently embedded within, for later use. The end result is key-secured broadcast content that provides the owner of the associated physical key all the freedoms and advantages of the present invention. Although the content was originally broadcast, it cannot be illegally copied or distributed. The present invention can be applied to pay per view offerings, as well as standard broadcast material.

Referring to the specifics of FIG. 8, the process of implementing the core acquisition option of broadcast digital content 124 (see FIG. 5) proceeds as follows. At step 180, a receiver/translator/recording device 190 receives digitally broadcast content in copy-protected format from a source 192 such as satellite, cable, Internet, or over-air. The broadcast content may be copy-protected using a copy-protection technology such as an enhanced CSS scheme. If a consumer wishes to only play (not record) the broadcast content, basic decoding (e.g., CSS decoding) is performed and the broadcast content is passed through to presentation device 194 for playback. The remaining steps below may be skipped.

If, however, the consumer wishes to record the broadcast content, the following additional steps are performed prior to sending the broadcast content on for playback. At step 181, the receiver/translator/recording device 190 retrieves an account number from the consumer's physical key (transponder) 196 over a secure RF link. At step 182, the receiver/translator/recording device 190 transmits the account number and its recorder serial code to a key provider's web site 198. Each device 190 contains a recorder serial code that uniquely identifies the device. The format of the recorder serial code may, for example, be MMMM.FFF.0123456789 where MMMM is a manufacturer identification, FFF is a facility identification, and the numbers represent a sequence number. At step 183, the key provider's web site 198 authenticates the data against its databases 200 and 202 and returns an "approved" or "rejected" response. A counter, used for the key provider's billing purposes, is incremented. At step 184, if a "rejected" response is received, the broadcast content cannot be recorded. If an "approved" response is received, the receiver/translator/recording device 190 translates the decoded content into a key-secured format by encoding it with the consumer's activation code, and records the key-secured content, with the recorder serial code permanently embedded within, to a storage device (that can optionally be an external device). The broadcast content can now be copied to and played back on any key-enabled playback device. At step 185, invoices 199 are generated and sent to content distributors by the key provider's web site 198 on a regular cycle. While providing excellent additional security and protections, steps 182 and 183 are not mandatory for the present invention to function with broadcast content. It may be desirable, for cost purposes, to produce receiver/translator/recording devices 190 not capable of communicating with the key provider's web site 198.

Figure 9:
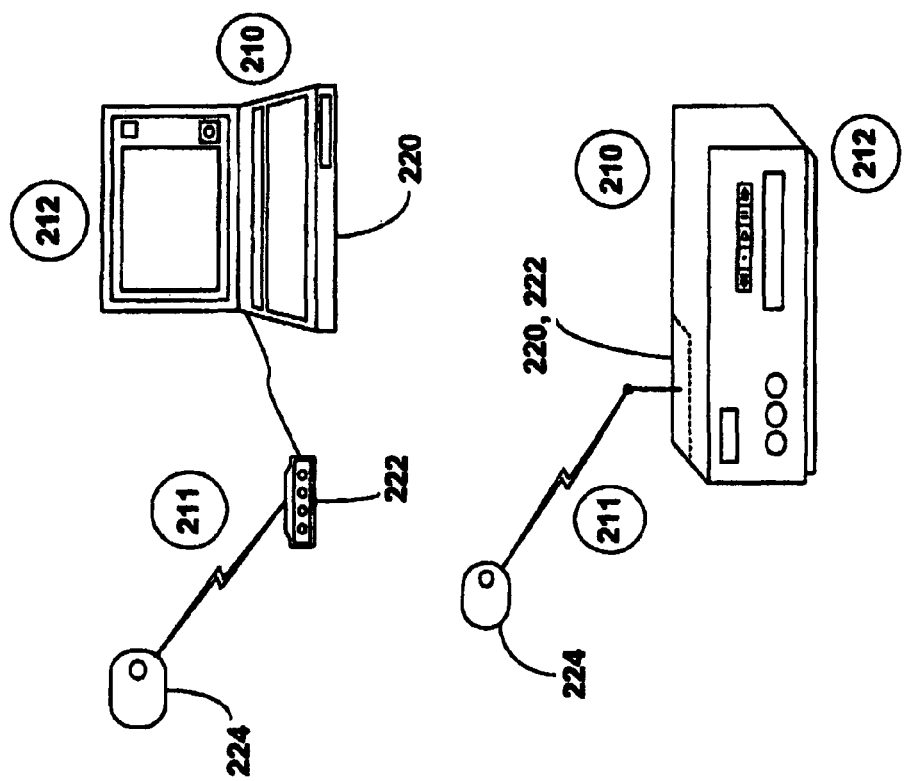
FIGS. 9a and 9b are block diagrams for implementing a core playback option of stand-alone devices.

Referring to FIGS. 9a and 9b generally, having acquired key-secured digital content and produced copies for playback on various devices such as a portable CD player, personal computer, home theater, etc., a consumer is now ready to use the digital content. Playback of key-secured content occurs as follows. A key-enabled playback device transparently reads information from a consumer's physical key and from the content file the consumer has requested to play. The pieces of information are then compared to validate that the physical key "matches" the content to be played. If the elements match, the device begins playback of the content. If the elements do not match, the device will not play the content and, depending upon the device's capabilities, may display an "invalid content" message. From a consumer's point of view, when used with legitimately-acquired content, the process is entirely transparent, effortless, and non-intrusive. The consumer is free to use their content on any key-enabled playback device, with the only restriction being that the content can be played only when the associated physical key is present. As noted above, the present invention gives consumers unprecedented freedoms and conveniences to use legitimately purchased content while still fully protecting content providers' rights.

Referring to the specifics of FIGS. 9a and 9b, the process of implementing the core playback option of stand-alone devices 126 (see FIG. 5) proceeds as follows. At step 210, a consumer requests playback of a key-secured content file via a playback device 220. The playback device 220 may, for example, be the consumer's personal computer (FIG. 9a) or a stereo amplifier (FIG. 9b) with integrated compact disc reader/player. At step 211, a receiver/decoder circuit 222 searches for a physical key (transponder) 224. The circuit 222 may be a separate component from the playback device 220 as in FIG. 9a or integrated into the playback device 220 as in FIG. 9b. If the physical key is not found, the playback device 220 displays an "invalid content" message. If the physical key is found, the receiver/decoder circuit 222 retrieves all available information from the physical key 224 over a secure RF link. At step 212, the user labels in the physical key 224 and the key-secured content file are compared. If the user labels do not match, the playback device 220 displays an "invalid" message. If the user labels do match, the receiver/decoder circuit 222 retrieves the software decryption key from the physical key 224 over the secure RF link between the physical key 224 and the playback device 220 and begins decryption of the encrypted portion of key-secured file. When the account number is decrypted, it is matched against the account number retrieved from the physical key 224. If the account numbers do not match, the playback device 220 displays an "invalid content" message. If the account numbers do match, the software decryption key is used by the playback device 220 to decrypt remaining data in the key-secured file for playback. The user label and the account number in the physical key serve as a first activation code, and the user label and the account number in the content file serve as a second activation code. These activation codes must match (or have some other predetermined association) in order for playback to proceed.

Figure 10:
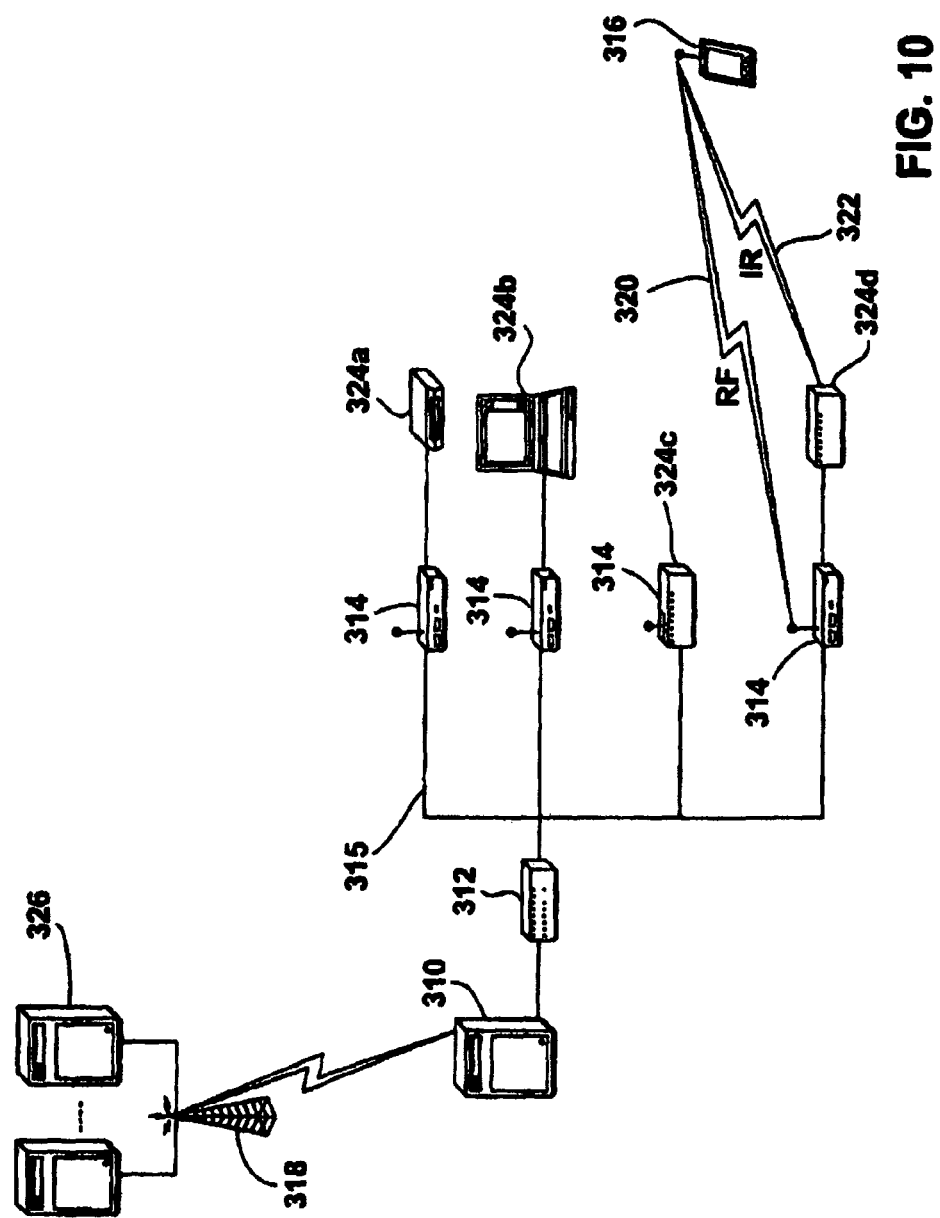
FIG. 10 is a block diagram for implementing a core playback option of networked devices.

Referring to FIG. 10 generally, while stand-alone playback devices (e.g., CD players, PCs, DVD players, etc.) are currently the norm, the convergence of these devices and the Internet will lead to an environment where centralized digital distribution systems proliferate. Security of content in these environments is critical yet challenging to accomplish without imposing great restrictions. The present invention can provide security to a centralized digital distribution system and, in addition, offers many important enhancements that greatly increase the convenience and usability of such a system. These enhancements include integration of the physical key into a portable handheld computer which then doubles as the system remote. In addition to controlling all networked components, the remote is used for tasks such as purchasing content from the Internet, and tracking the movement of a user throughout a facility to provide automatic "content following" (i.e., where content playback follows the user from room to room). The centralized nature of the digital content distribution system means that only one storage device is required to maintain a consumer's entire digital content library (e.g., music, movies, software, E-books, etc.) and to feed that content to any networked playback device.

Referring to the specifics of FIG. 10, there is shown a centralized digital content distribution system for implementing the core playback option of networked devices 128 (see FIG. 5). The system is used in an establishment such as a residence or entertainment facility. The system includes a digital content server 310, a distribution hub 312, a plurality of remote clients 314, and a portable remote control 316. The digital content server 310 stores digital content acquired from a source 318 such as satellite, cable, Internet, or over-air. In addition, the digital content server 310 may store digital content uploaded from a standard component 324. The plurality of remote clients 314 are located in different rooms of the establishment and linked to the digital content server 310 via the distribution hub 312 or switch. The remote clients 314 are linked to the distribution hub 312 by a backbone transmission network 315. The backbone transmission network 315 may be wireless or wired with fiber optic cables, coaxial cables, or twisted pair cables, may employ a networking protocol such as Ethernet, Wi-Fi, Arcnet, or ATM (Asynchronous Transfer Mode), and may employ a communications protocol such as TCP/IP. Each remote client 314 includes a network interface card (NIC) for interfacing with the backbone transmission network 315.

The remote control 316 is adapted to communicate with each of the remote clients 314 and select the digital content stored in the digital content server 310. The remote control 316 is essentially a personal digital assistant (i.e., hand-held computer) including a display and added remote control circuitry. The display may, for example, be a liquid crystal display (LCD). The added remote control circuitry includes "system remote" circuitry and "universal remote" circuitry.

The "system remote" circuitry in the remote control 316 is for establishing a first wireless transmission link 320 with each of the remote clients 314. The first wireless transmission link 320 may be a secure radio link (RF) as shown or an infrared link (IR). Upon establishing the first wireless transmission link 320 with one of the remote clients 314, the remote control 316 serves as a system remote capable of (1) displaying, scanning, and selecting the digital content available on the digital content server 310 and downloading the selected digital content from the digital content server 310 to the linked remote client 314 and (2) controlling the digital content server 310 to acquire or download digital content from a source 318 such as satellite, cable, Internet, or over-air. As used herein, the term "download" and similar variations thereof (e.g., downloaded, downloading, etc.) is intended to cover the transfer of content from one device to a receiving device whether the content is stored on the receiving device or merely "streamed" to the receiving device for immediate playback. The remote control 316 preferably includes a display for displaying the digital content. The display may, for example, be a liquid crystal display (LCD). As a user holding the remote control 316 moves from room to room of the establishment, the remote control 316 successively establishes wireless transmission links 320 with the remote clients 314 in the respective rooms. In this way, the digital content available on the digital content server 310 follows the user's movement from room to room.

In a preferred embodiment, the first wireless transmission link 320 is a secure radio link established by matching transceivers in the remote control 316 and each remote client 314. The matching transceivers are preferably small, inexpensive Bluetooth™ radio chips that operate in the unlicensed ISM band at 2.4 GHz and avoid interference from other signals by hopping to a new frequency after transmitting or receiving a packet. The radio chips are integrated into the respective remote control 316 and each remote client 314, which can then communicate over short distances and through obstacles by means of radio waves. Wireless technologies other than Bluetooth, such as Wi-Fi, may be used to communicate remote control signals between the remote control 316 and each remote client 314.

The "universal remote" circuitry in the remote control 316 is for establishing a second wireless transmission link 322 with standard components 324 connected to the remote clients 314. The second wireless transmission link 322 is preferably an infrared link (IR) as shown. Upon establishing the second wireless transmission link 322 with one of the standard components 324, the remote control 316 series as a universal remote capable of operating the standard component 324. The standard component 324 may, for example, be an audio receiver (stereo amplifier), an audiovisual receiver, a video monitor (television), etc. The standard components 324 may be physically separate from, but linked to, the respective remote clients 314 or may be physically integrated into the respective remote clients 314 like integrated device 324c.

The digital content stored on the digital content server 310 may be formatted as a compact disc (CD), digital video disc (DVD), MP3, electronic book, software, etc. When the remote control 316 is linked to one of the remote clients 314, a user may scan and select digital content to be downloaded from the digital content server 310 to the remote client 314 and converted by the remote client 314 to a standard playable format (e.g., analog format) that can be played on the associated standard component 324. The selected digital content is downloaded from the digital content server 310 to the remote client 314 as raw digital data packets. The remote client 314, in turn, converts the downloaded digital content to a standard component output(s) compatible with a standard component 324 connected to the remote client 314, and the standard component 324 plays the digital content. Ports may, for example, include S-Video, RCA jacks, serial ports, Universal Serial Bus, Ethernet, Wi-Fi, Firewire™, Bluetooth, RF, or other similar outputs. The standard component 324 incorporates, or is linked to, audio speakers for broadcasting any audio signals received from the remote client 314 and a video monitor for displaying any video signals received from the remote client 314.

All content is stored on the digital content server 310 digitally, and is key-secured if obtained via the download or broadcast acquisition options of FIGS. 6 and 8. If the digital content is key-secured, the plurality of remote clients 314 include decryption circuitry (i.e., receiver/decoder circuit) for unlocking the digital content. The digital content selected for download from the digital content server 310 to a remote client 314 preferably remains encrypted until converted to a standard component output(s) in the remote client 314. The remote client 314 acts as a converter between key-secured digital content from the digital content server 310 and the standard component output(s). To decrypt the selected digital content, the remote control 316 contains a physical key initially acquired from a key provider in accordance with the present invention. The digital content is initially acquired from a content provider 326 that marks the digital content with an activation code associated with the physical key. The decryption circuitry in the remote client 314 receives an activation code from the remote control 316 via the wireless transmission link 320 and is enabled to unlock and convert the digital content to a playable format if the activation code in the remote control 316 is associated with the activation code in the digital content. If the activation code in the remote control 316 is not associated with the activation code in the digital content, the remote client 314 will not unlock and convert the digital content.

In an alternative embodiment, the remote clients 314 are eliminated and the standard components 324 are linked directly to standard component outputs of the distribution hub 312 by the backbone transmission network 315. In this case, the distribution hub 312 serves as a switch, and the digital content server 310 contains the decryption circuitry for unlocking the digital content. As the digital content is decrypted, it is converted to a playable format and fed to the distribution switch 312 for delivery to the appropriate standard component 324. The decryption circuitry in the digital content server 310 receives the activation code from the remote control 316 and is only enabled to unlock and convert the digital content to a playable format if the activation code in the remote control 316 is associated with the activation code in the digital content.

Instead of decrypting the digital content so that it can be played, the digital content may be downloaded (or "passed through") in its encrypted format to a storage device such as a media burner 324a or computer hard disk 324b for storage thereon. When a user ultimately desires to play the stored digital content on a media player, the media player must contain the decryption circuitry for unlocking the digital content. After unlocking the digital content, the media player converts the unlocked digital content to a playable format and plays the digital content. The decryption circuitry in the media player receives the activation code from the remote control 316 or physical key with the same activation code. The media player is only enabled to unlock and convert the digital content to a playable format if the activation code in the remote control 316 or physical key is associated with the activation code in the digital content.

In addition to downloading selected digital content from the digital content server 310 to the remote clients 314, data (e.g., MP3, CD, DVD, software, etc.) from the standard components 324 can be uploaded to the digital content server 310 and stored digitally thereon. This allows for storage of legacy content on the digital content server 310.

Figure 11:
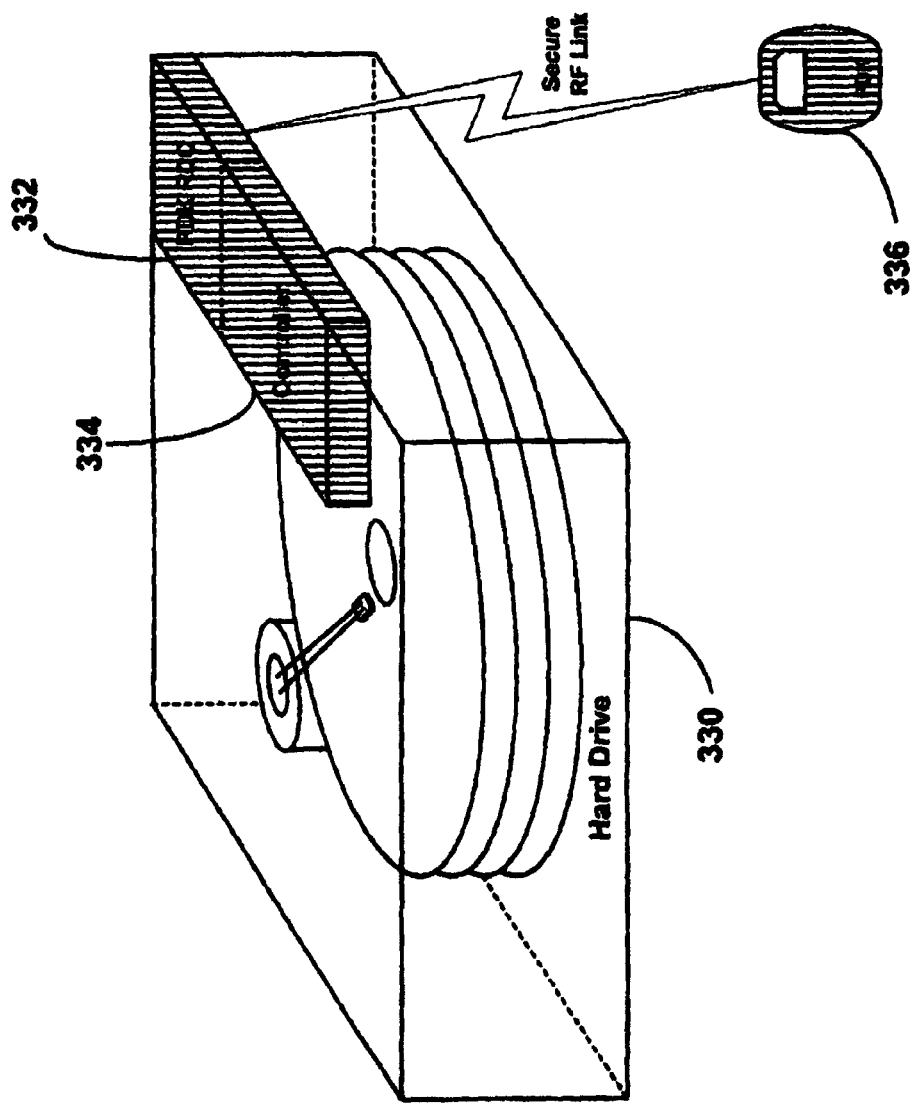
FIG. 11 is a block diagram of a standard computer hard drive incorporating an integrated PDK-RDC (receiver/decoder circuit) for the purpose of enabling multiple methods of securing digital content.

Referring to FIG. 11 generally, a digital content security system and method protects computers from unauthorized use and protects the digital content stored on computers from being wrongfully accessed, copying, and/or distributed. The basic components of the Personal Digital Key Digital Content Security System (PDK-DCSS) are (1) a standard hard drive device 330, with the addition of a PDK Receiver/Decoder Circuit (PDK-RDC) 332 integrated into the controller 334, and (2) a PDK-Key 336 associated with the PDK-RDC as described above. The standard computer hard drive 330 incorporates the integrated PDK-RDC 332 for the purpose of enabling multiple methods of securing digital content. Hard drives 330 incorporating a PDK-RDC 332 are referred to herein as PDK hard drives. While the PDK-DCSS diagrams show the PDK-RDC 332 as being integrated with the hard drive's controller 334, all OS-level protections described below can be implemented using externally-based PDK-RDCs.

A PDK hard drive 330 is similar to any standard, currently available hard drive with the exception of the PDK-RDC 332 (which is integrated into the drive's controller circuit 334). A PDK-RDC 332 is an integrated circuit able to process PDK-Key information, as well as encrypt/decrypt PDK-compliant digital content. Additionally, this circuit 332 is able to secure the hard drive 330 itself.

This is implemented by the circuit 332 enabling or disabling the hard drive's controller 334 depending on whether an associated PDK-Key 336 (one which is uniquely and permanently associated with the PDK hard drive 330) is present. Each PDK hard drive 330 would typically be delivered with its own PDK-Key 336.

Secure RF communications between a PDK-Key 336 and its associated hard drive 330 occurs in the same manner as described above. It should be noted that software drivers can optionally be designed to allow for dynamic key assignment (assigning of keys after purchase to enable key swapping, or assigning of individual keys to multiple devices).

The PDK-Key and RDC technology is utilized to provide two categories of protection:

1) Hard drive access control—where an entire drive 330 is either completely accessible (unlocked) or inaccessible (locked), and/or individual data sectors or clusters of data sectors are optionally encrypted/decrypted, depending on whether the specific PDK-Key 336 associated (and shipped) with the drive 330 is within range. This category of protection can be accomplished transparently to the operating system (OS) responsible for managing the drive.

2) OS-level independent file protection—where the drive's RDC 332 functions independently of the drive 330 to protect individual files (typically copyrighted material) from wrongful copying. In this role, the RDC 332 works with any PDK-Key 336 (not just the one delivered with the drive 330) and any PDK-compliant file (they do not have to be stored on or associated with the hard drive 330). This category of protection requires an OS-level software driver be run under the OS responsible for managing the drive.

By utilizing these two categories of protection in various ways, four unique levels of content protection are enabled. Two of the levels (Drive-Level and Sector-Level) do not require external software support, while the remaining two (File-Level and Network-Level) require software drivers, as well as a stand-alone application for Network-Level implementations. Each of the four levels is defined below.

Figure 12:
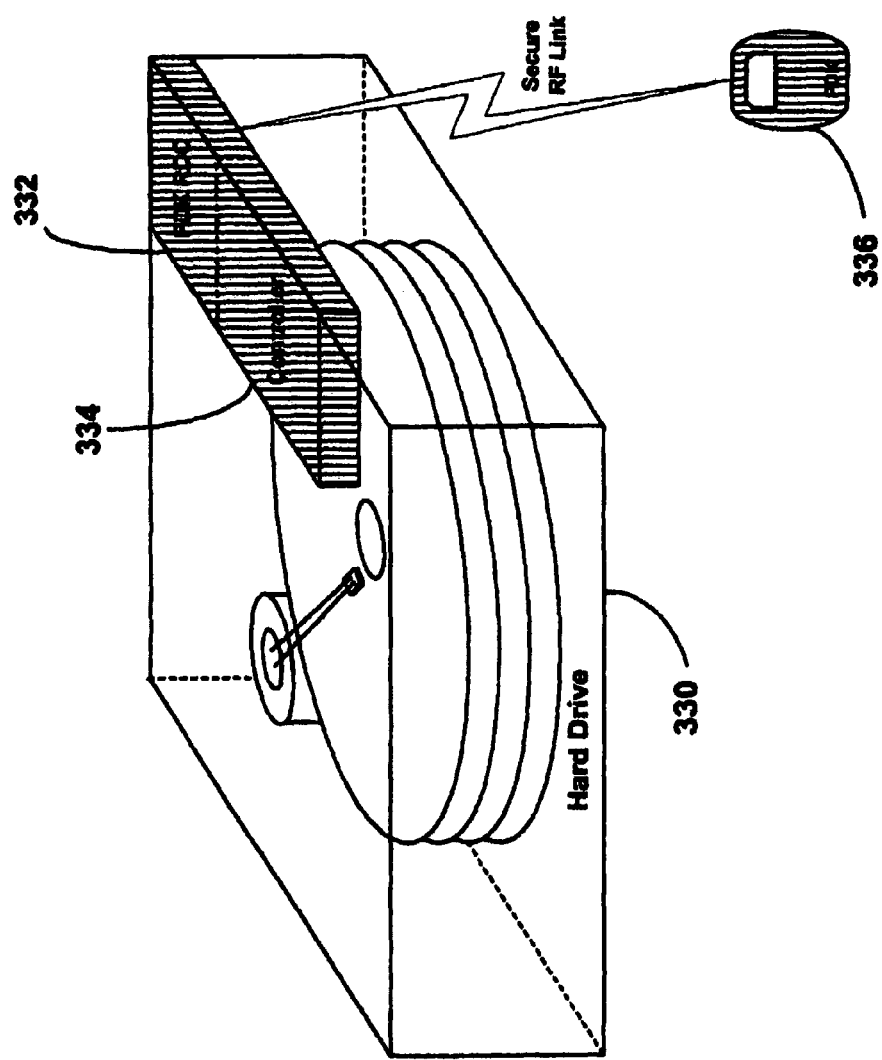
FIG. 12 is a block diagram for implementing Drive-Level protection and Sector-Level protection in connection with the computer hard drive.
Figure 13:
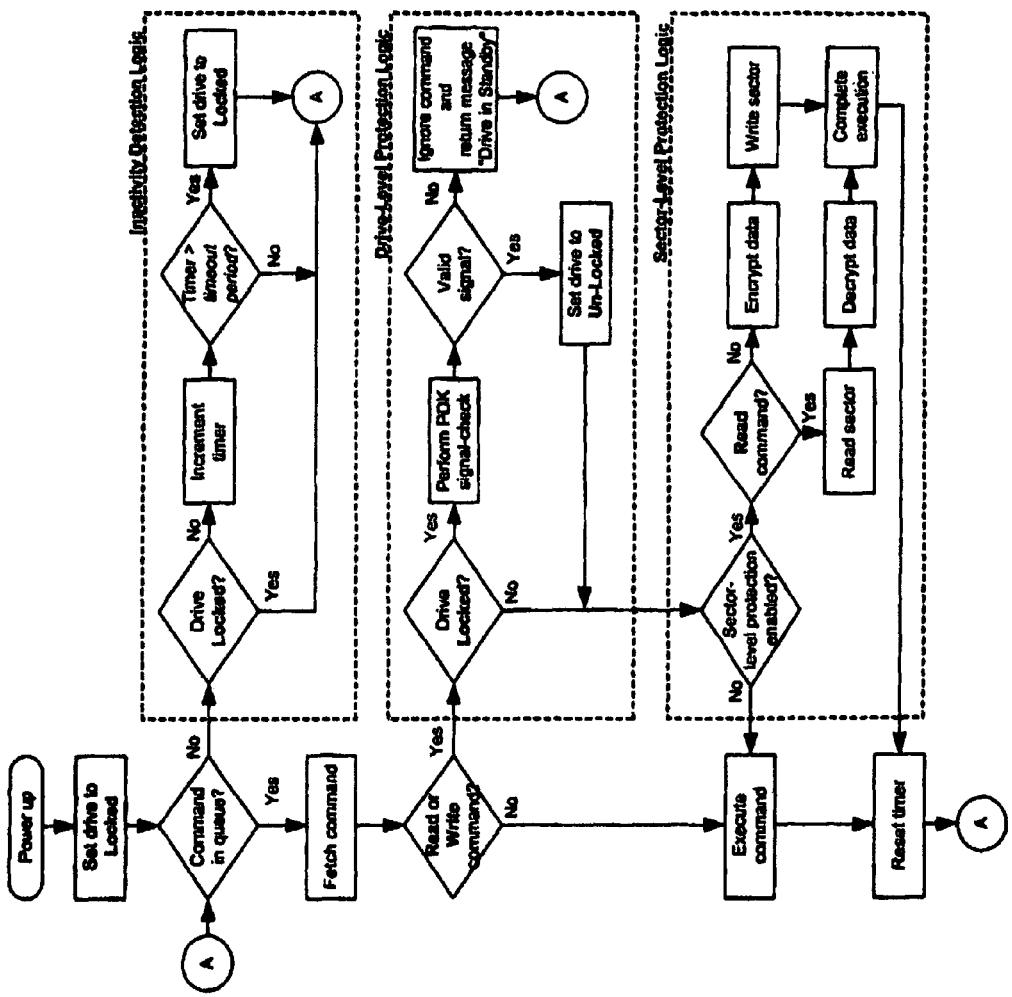
FIG. 13 is a flow chart of the logic executed by the PDK-RDC for implementing Drive-Level protection and Sector-Level protection.

Referring to FIGS. 12 and 13 for Drive-Level protection, when implemented, a PDK hard drive 330 will only function when the associated PDK-Key 336 is within range. The drive's controller 334 is disabled whenever the PDK-Key 336 is not present. The contents of files stored on the drive 330 are not encrypted. The Drive-Level protection feature is designed to protect the hard drive's owner by locking access to the PDK hard drive 330 whenever the associated PDK-Key 336 is not present (i.e. when the owner momentarily steps away from the computer, if the computer is stolen, etc.).

Referring to FIGS. 12 and 13 for Sector-Level protection, when enabled, every sector (or cluster of sectors) read or written is encrypted/decrypted by the RDC 332 using the drive's associated PDK-Key 336. Because the encryption is performed at Sector-Level as opposed to File-Level, the encoding can be accomplished without requiring any changes, involvement, or acknowledgement of the OS responsible for managing the drive. The Sector-Level protection feature is designed to further protect the hard drive's owner (beyond Drive-Level protection) by encrypting the contents of the files stored on the drive, without requiring any software modifications (OS, application, etc.). The security advantage is that if the drive access is in some way defeated, the contents of files on the drive are still protected. It should be noted that if users retrieve files from drive and purposely transfer them anywhere else (via email, memory sticks, etc.), the data will no longer be protected. Drive-Level protection and Sector-Level protection may be used individually or in combination. Also, as noted above, it should be understood that Sector-Level protection may be applied to individual data sectors or clusters of data sectors.

FIG. 13 illustrates the logic executed by the RDC 332 for implementing Drive-Level protection and Sector-Level protection. The logic ensures OS-level commands (save entire file, read entire file, etc.) are given adequate time to complete. This enables implementation of logic without requiring OS changes, involvement, or acknowledgement.

Figure 14:
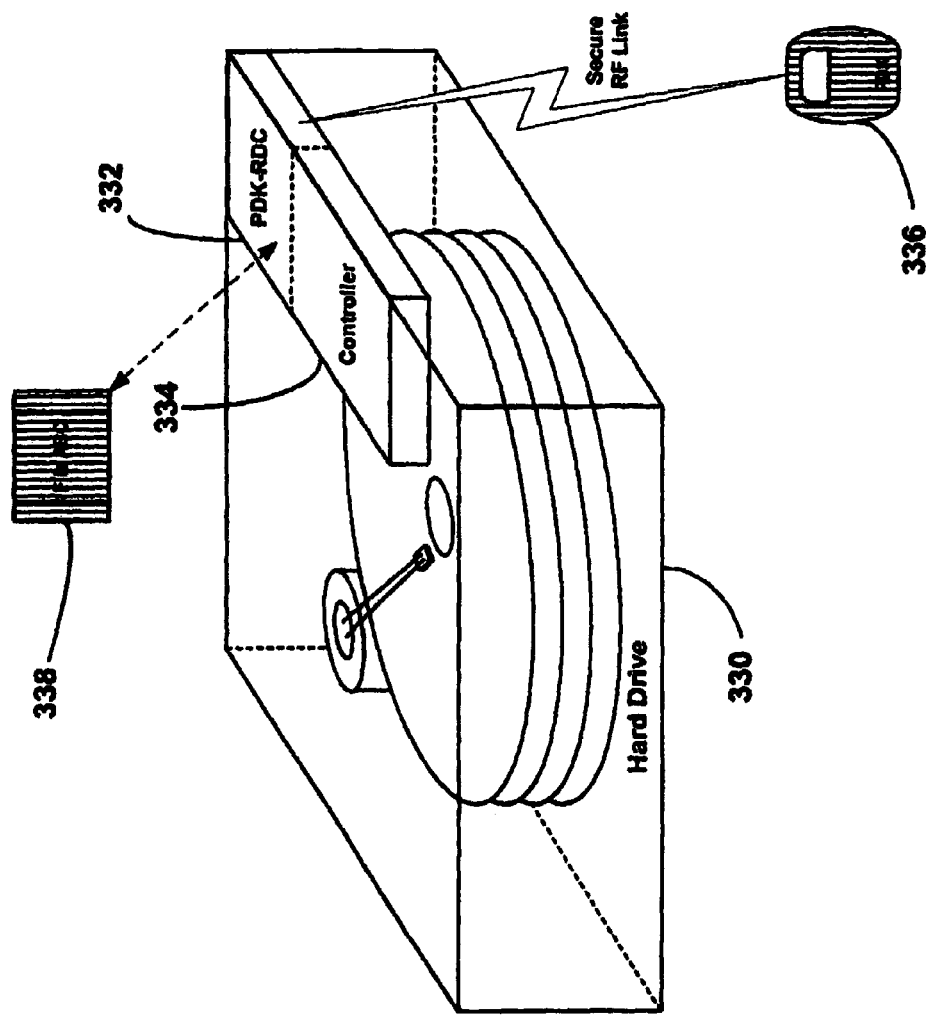
FIG. 14 is a block diagram for implementing File-Level protection in connection with the computer hard drive.

Referring to FIG. 14 for File-Level protection, implemented as an OS-level software driver utilizing the PDK-RDC 332 integrated in the PDK hard drive 330, File-Level protection provides standard PDK digital rights management services and functionality as described above. As needed, the driver instructs the RDC 332 to acquire PDK-Key information, validate the key-to-file match, and use the key's information to perform actual encryption/decryption of the file (as a whole, not at the sector level). In the illustrated example, the file ABC 338 (which can reside on any storage device, in memory, etc.) is compared to any PDK-Key 336 within range of the PDK-RDC 332. If a match is found, the PDK-RDC 332 will decrypt the file 338 for use with whatever playback mechanism placed the request. Any PDK-Key 336 can be utilized, not just the key 336 associated with the PDK hard drive 330. When employed for File-Level protection (and Network-Level protection as described below), the PDK-RDC 332 functions independently of the hard drive 330 in which it resides. While PDK-compliant files it encrypts or decrypts may reside on the resident hard drive 330 and may be associated with the drive's PDK-Key 336, they do not have to be. The PDK-RDC 332 can work with other PDK-Keys and files residing on other mediums. When used in this manner, the PDK-RDC 332 can be thought of as just coincidentally residing within the hard drive 330. For File-Level and Network-Level protection, the RDC 332 may be implemented as a separate circuit board (not integrated within the hard drive 330) and still provide identical functionality.

The primary use of File-Level protection is to secure and protect private or copyrighted material from wrongful copying and distribution. Because copies of any PDK-compliant files can only be accessed when the associated PDK-Key is present, File-Level protection enables copies (intended for use by the holder of the associated key) to be produced effortlessly and securely. In addition to the distribution of copyrighted content such as music and movies as described above, software developers can distribute their software products via the Internet with the same ease and security. Software distributed in this manner would allow the legal recipient to make unlimited copies (for backup purposes, use on a home computer, etc.), yet the copies would only function when the associated key is present, preventing unauthorized copies from being wrongfully distributed and used.

The File-Level protection feature is designed to protect publishers of private or copyrighted material. Users can protect any file by converting it to PDK-compliant format; however, security of document files can be compromised by key holders not wishing to maintain the file's integrity. Because, while a Microsoft Word document (as an example) may be stored in the PDK-compliant protected format, once opened the contents could be cut and pasted into another application (e.g., an email program) thereby defeating the protection. Therefore the use of File-Level protection for use with documents is only applicable for entrusted recipients (individuals desiring to protect the content of which they are in possession). Non-document files, however, are not subject to these limitations.

Figure 15:
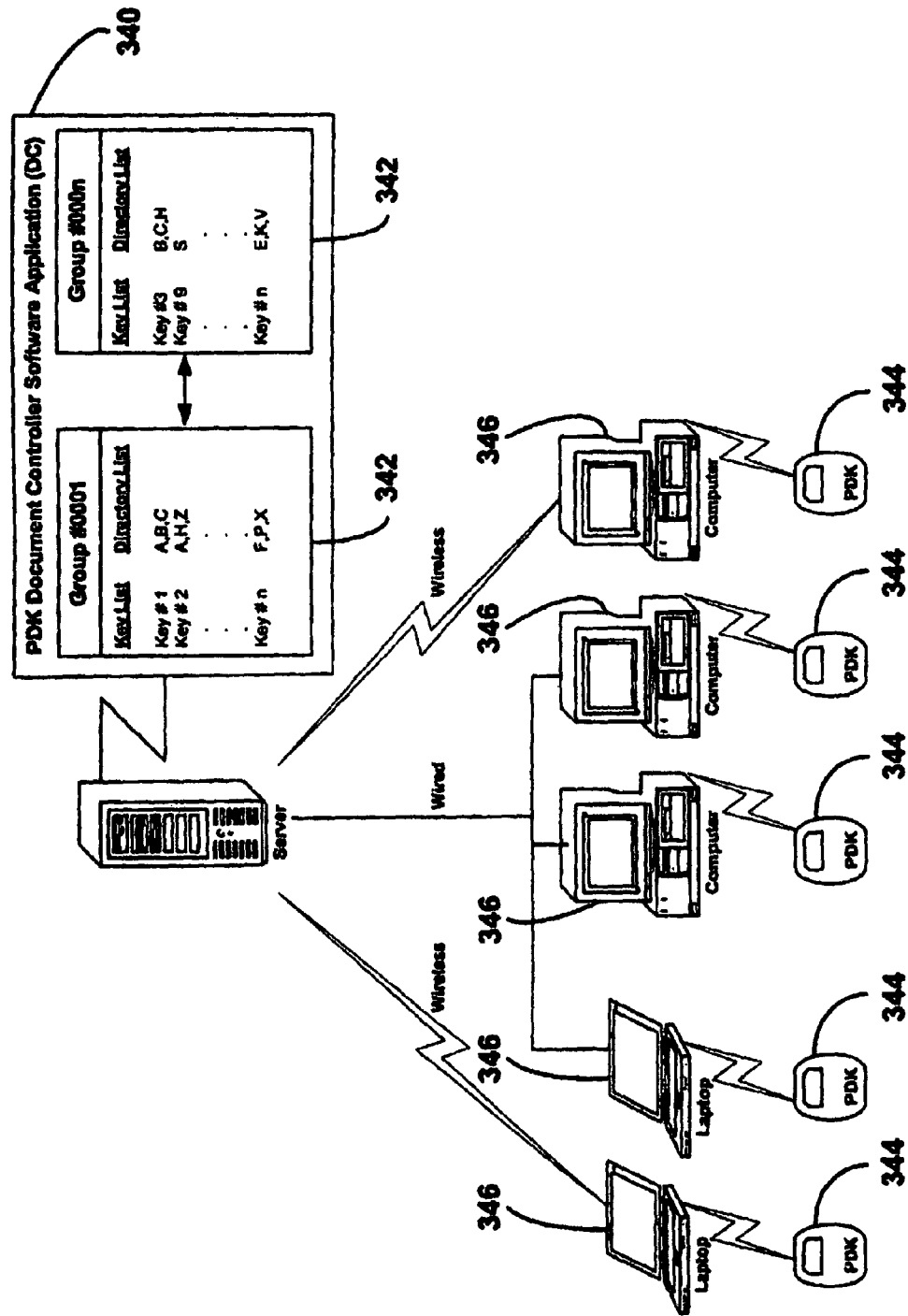
FIG. 15 is a block diagram for implementing Network-Level protection by expanding File-Level protection to a network environment.

Referring to FIG. 15 for Network-Level protection, File-Level Protection can be expanded to a network environment by employing a centralized software application/database called a PDK Document Controller (DC) 340 ruing on a server 342. A DC 340 enables the creation of Groups 342 that list which PDK-Keys 344 are allowed access to files in specific directories. All files stored in directories controlled by the DC 340 are automatically encrypted using the DC administrator's PDK-Key and thereby become PDK-compliant files. This process places all files stored in the DC 340 in a uniformly encrypted format.

Each user request for a file residing in a directory listed in a DC Group 342 results in the following steps. An RDC located in the requester's workstation 346 acquires information from the user's PDK-Key 344 and relays that information to the DC 340. The DC then enables appropriate access as defined by the DC's Group database information. Specifically, the DC 340 performing a lookup of the requester's PDK-Key 344 in the appropriate Group's tables. If the DC 340 determines that the PDK-Key 344 is listed in a Group 342 that also lists the directory containing the file the user wishes to access, the DC 340 knows that a valid PDK-Key 344 was used in the file request and grants access. The requested file is first decrypted with the administrator's PDK-Key, re-encrypted with the requester's PDK-Key 344, and then downloaded to the user's workstation 346. The foregoing process mirrors the process employed when using PDK to download digital media files from the Internet.

The Network-Level protection feature is designed to protect publishers of private or copyrighted material. Users can protect any file by converting it to PDK-compliant format; however, security of document files can be compromised by key holders not wishing to maintain the file's integrity. Because, while a Microsoft Word document (as an example) may be stored in the PDK-compliant protected format, once opened the contents could be cut and paste into another application (e.g., an email program) thereby defeating the protection. Therefore, the use of File-Level protection for use with documents is only applicable for entrusted recipients (individuals desiring to protect the content of which they are in possession). Non-document files, however, are not subject to these limitations. The system is well suited for establishing centralized databases of secure documents intended for distribution to entrusted recipients such as personnel in a law firm or medical facility.

While the present invention has been described with reference to one or more particular embodiments, those skilled in the art will recognize that many changes may be made thereto without departing from the spirit and scope of the present invention. A number of enhancements and variations can be implemented/utilized that effectively broaden the PDK technology's scope and utility. These enhancements and alternative embodiments are summarized below.

Integration of RDCs into Alternative Storage Devices. This embodiment involves integrating RDCs into alternative storage mechanisms beyond those of basic hard drives. These storage mechanisms include pure RAM/ROM-based storage commonly included/used in devices such as PDAs, cell phones, printer, copiers, faxes, scanners, MP3 players, GPS systems, digital cameras, computer motherboards, and DVR players, as well as portable storage devices such as Memory Sticks, Secure Digital memory cards, or any similar such product, in which case the RDC is either directly installed on the device, or integrated into the device in which the memory cards/sticks are inserted.

When an RDC is utilized in this manner, File-Level and Network-Level security function in the same manner as that described above for PDK hard drives. Drive-Level and Sector-Level security function in the same logical manner as that described for hard drives, but the physical implementation varies so as to control the bus structure that provides the communications path between the storage mechanisms and their hosting devices. As with PDK hard drives, access to the storage is enabled/disabled by interrupting the communications path, signaling to the hosting device that the storage is either "ready" or "busy," effectively enabling/disabling the device itself. To save batteries, RDCs used in this manner may only check for the presence of the associated PDK-Key on some periodic basis (versus every read or write sequence). And similar to PDK hard drives, Sector-Level security can be optionally utilized to encrypt/decrypt data traveling over the bus prior to writes and after reads to provide PDK's standard Sector-Level data encoding functionality.

As when utilized in PDK hard drives, the PDK's security features provide the same convenient, non-intrusive, wireless security mechanism for the above-defined devices. This security mechanism protects any data stored on such devices in the event they are ever stolen, left unattended, or even purposely "disabled" to prevent access to sensitive content (i.e. preventing minors from accessing adult files, websites, etc.). When the associated PDK-Key(s) is not present, these devices and their storage means are locked and disabled.

Dynamic PDK-Key Management. Utilizing dynamic PDK-Key management, PDK-Keys can be assigned to an RDC (whether integrated into a PDK hard drive or some other hosting device, or implemented independently) by a user (versus requiring such assignment at time of production). This capability is accomplished by including the required logic within the RDC's internal firmware (versus using an externally-based software driver to supply such capability).

Using this capability, a user can optionally assign any PDK-Key to act as the RDC's master key (the first key assigned to the device). Then by involving this master key (to prove the original "owner's" validation of the process), the user can assign (or remove) additional keys to the PDK-device. The general benefits of this feature include:

- The ability for the individual possessing the master key to create backup keys (to be stored and later retrieved in the event the master is ever lost), and to allow other users (those possessing additional keys) to also access their PDK device(s).
- The option to ship PDK-RDCs (in any configuration, host devices, etc.) without any PDK-Keys. And to allow such devices containing these RDCs (such as PDK hard drives) to optionally function with all or part of the PDK-technology never enabled or utilized. For instance, a user may elect to not enable Drive-Level and Sector-Level security features, but still utilize the functionalities of File-Level and Network-Level security.
- Giving users the option to purchase and associate a PDK-Key at a later time, or importantly, assign a PDK-Key they already utilize for another PDK-based device. This allows a user to utilize a single PDK-Key to provide access to all their PDK-based devices.

This built-in (firmware-based) PDK-Key configuration/management capability greatly enhances PDK's overall flexibility and ease of setup/use.

Independent RDC configuration. While integrating an RDC into a hard drive offers numerous benefits, RDCs may exist separately from hard drive mechanisms. In this configuration (as previously defined) an RDC's physical circuitry may exist in the form of a PC Card, a PC expansion board that plugs into a standard PC expansion slot, a USB-based plug-in board, or any other similar design able to interface with a hosting device. Used in this manner, RDCs provide all previously defined functionalities with the exception of basic hard drive access-control.

Buffer Flush & Notification Software Driver. This enhancement involves using a simple software device driver to recognize when a PDK-Key is out of range (by "watching" for signals from the RDC), and when such a condition is detected to flush (empty) the host system's "read" buffer (effectively clearing any data the system may have been cached in internal memory in order to speed data access), and display a simple message indicating the PDK-Key is in/out of range. This optional mechanism can be utilized with any RDC configuration and on any PDK-protected device.

Each of these embodiments and obvious variations thereof is contemplated as falling within the spirit and scope of the claimed invention, which is set fort in the following claims.

The invention claimed is:

1. A system comprising:
   a tangible personal digital key including a first activation code comprising a user label and an account number and a first wireless transceiver to wirelessly transmit the first activation code;
   a key provider device coupled to receive the first activation code and to authenticate the first activation code;
   a content provider device to mark a digital content with an unlock code associated with the first activation code responsive to the key provider device authenticating the first activation code; and
   a computing device coupled to the tangible personal digital key via a wireless network, wherein the computing device comprises a reader/decoder circuit that receives the first activation code comprising the user label and the account number from the tangible personal digital key and transmits the first activation code received from the tangible personal digital key to the key provider device, wherein the computing device is programmed to receive the digital content marked with the unlock code associated with the first activation code from the content provider device responsive to the key provider device authenticating the first activation code received from the tangible personal digital key; and
   a playing device comprising a transceiver with a wireless coverage range wherein the playing device is programmed to perform the operations of:
      receiving the digital content marked with the unlocked code from the device;
      receiving the first activation code from the tangible personal digital key within the within the wireless coverage range;
      receiving a request to access the digital content;
      in response to receiving the request, comparing the first activation code with the unlock code of the digital content received from the device; and
      accessing the digital content based on result of the comparing.

2. The system of claim 1, wherein the computing device comprises a computer with a computer hard drive and wherein the reader/decoder circuit is located in the computer hard drive.

3. The system of claim 2, wherein the wireless network is a secure radio frequency (RF) link between the computing device and the tangible personal digital key.

4. The system of claim 2 wherein the computer transmits and receives data from the key provider device through an Internet connection.

5. The system of claim 2, wherein the key provider device includes a database, wherein the database includes an account identifier and a personal digital key identifier.

6. The system of claim 2, wherein the key provider device includes a database, wherein the key provider device authenticates the first activation code using personal digital key data stored in the database.

7. The system of claim 1, wherein the computing device comprises a swipe unit and wherein the reader/decoder circuit is located in the swipe unit.

8. The system of claim 7 wherein the swipe unit transfers and receives data from one or more of the key provider device and the content provider device through an Internet connection.

9. The system of claim 7 wherein the first activation code transmitted by the tangible personal digital key is authenticated using personal digital key data stored in a database.

10. The system of claim 1, further comprising a second personal digital key wherein the second digital key includes a third activation code comprising a user label associated with a second user and an account number associated with the second user.

11. The system of claim 1, wherein the reader/decoder circuit is integrated with the computing device.

12. The system of claim 1, wherein the computing device comprises a computer including a hard drive and wherein the reader/decoder circuit comprises a circuit board coupled to the hard drive.

13. The system of claim 1 wherein the first activation code is the unlock code.

14. The system of claim 1 wherein the computing device is further programmed to perform the operations of responsive to receiving a request to access the digital content, compares the first activation code with an unlock code of digital content to be accessed, and responsive to determining the first activation code and the unlock code of digital content to be accessed are associated, accesses the digital content.

15. The system of claim 1 wherein the content provider device encrypts the digital content and decrypt the digital content when the tangible digital personal key is in proximity to the device to communicate the first activation code to the device.

16. The system of claim 1 wherein the content provider device encrypts the digital content, wherein the computing device decrypts the digital content while the tangible digital personal key is in proximity to the computing device to communicate the first activation code to the computing device, and wherein the computing device is unable to decrypt the digital content when the tangible digital personal key is no longer in proximity to the device to communicate the first activation code to the device.

17. The system of claim 1 wherein the user label is unencrypted and the account number is encrypted.

18. The system of claim 1 wherein the user label is used to select the tangible personal digital key as an appropriate tangible personal digital key from a plurality of tangible personal digital keys within range of the reader/decoder circuit.

\* \* \* \* \*